(12) United States Patent
Abe et al.

(10) Patent No.: US 9,758,069 B2
(45) Date of Patent: Sep. 12, 2017

(54) VEHICLE SEAT

(71) Applicant: TS TECH CO., LTD., Asaka-shi, Saitama (JP)

(72) Inventors: Hirohisa Abe, Tochigi (JP); Takeshi Akutsu, Tochigi (JP); Haruki Ikawa, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 69 days.

(21) Appl. No.: 14/758,164

(22) PCT Filed: Dec. 27, 2013

(86) PCT No.: PCT/JP2013/085253
§ 371 (c)(1),
(2) Date: Jun. 26, 2015

(87) PCT Pub. No.: WO2014/104361
PCT Pub. Date: Jul. 3, 2014

(65) Prior Publication Data
US 2015/0329019 A1 Nov. 19, 2015

(30) Foreign Application Priority Data

Dec. 28, 2012 (JP) ................................ 2012-288618
Mar. 7, 2013 (JP) ................................ 2013-045881
(Continued)

(51) Int. Cl.
*B60N 2/07* (2006.01)
*B60N 2/30* (2006.01)
*B60N 2/015* (2006.01)

(52) U.S. Cl.
CPC ........ *B60N 2/3011* (2013.01); *B60N 2/01541* (2013.01); *B60N 2/3009* (2013.01);
(Continued)

(58) Field of Classification Search
CPC B60N 2/0311; B60N 2/01541; B60N 2/3009; B60N 2/3065; B60N 2/3075; B60N 2/309
See application file for complete search history.

(56) References Cited

U.S. PATENT DOCUMENTS

2003/0094830 A1 5/2003 Kamida et al.
2005/0082883 A1 4/2005 Park
(Continued)

FOREIGN PATENT DOCUMENTS

CA 2661130 A1 * 4/2008 ........... B60N 2/3013
CN 1608890 A 4/2005
(Continued)

OTHER PUBLICATIONS

Office Action issued in related application CN 201380066978.1, dated Sep. 21, 2016, with English language translation, 12 pages.
(Continued)

*Primary Examiner* — Lori L Lyjak
(74) *Attorney, Agent, or Firm* — Drinker Biddle & Reath LLP

(57) ABSTRACT

A vehicle seat compactly stowed in a stowed state while suppressing contact between pivot links. A stowable seat includes an inner link, an outer link, and a guide link coupled to a seat cushion of the seat, the links are pivoted with respect to a vehicle body floor in order to move the seat cushion to a stowed position. The inner link, the outer link, and the guide link are arranged at positions different from each other in the width direction of the seat so that contact between the pivot links is suppressed. Further, the guide link is arranged at a position different from the inner link and the outer link in the front to back direction of the seat so that the seat can be compactly stowed.

14 Claims, 31 Drawing Sheets

(30) Foreign Application Priority Data

| Apr. 16, 2013 | (JP) | ................................ | 2013-085818 |
| Apr. 16, 2013 | (JP) | ................................ | 2013-086006 |
| May 31, 2013 | (JP) | ................................ | 2013-115678 |
| Oct. 17, 2013 | (JP) | ................................ | 2013-216450 |

(52) U.S. Cl.
CPC ........... *B60N 2/309* (2013.01); *B60N 2/3065* (2013.01); *B60N 2/3075* (2013.01)

(56) References Cited

U.S. PATENT DOCUMENTS

| 2006/0138795 A1 | 6/2006 | Weber |
| 2009/0243323 A1 | 10/2009 | Mitsuhashi |

FOREIGN PATENT DOCUMENTS

| CN | 1798667 A | 7/2006 |
| JP | 2001-206118 A | 7/2001 |
| JP | 2005-059765 A | 3/2005 |
| JP | 4019456 B2 | 12/2007 |
| JP | 4226414 B2 | 2/2009 |
| JP | 2009-286335 A | 12/2009 |
| JP | 2010-013034 A | 1/2010 |
| JP | 4446101 B2 | 4/2010 |
| WO | WO 2010125677 A1 * 11/2010 ........... B60N 2/3011 |

OTHER PUBLICATIONS

Office Action issued in related application JP 2013-045881, dated Nov. 22, 2016, with machine generated English language translation, 4 pages.

Office Action issued in related application JP 2013-085818, dated Nov. 22, 2016, with machine generated English language translation, 6 pages.

Office Action issued in related application JP 2013-086006, dated Nov. 22, 2016, with machine generated English language translation, 4 pages.

Office Action issued in related application CN 201380066955.0, dated May 5, 2016, with machine generated English language translation, 14 pages.

Office Action issued in related application CN 201380066955.0, dated Oct. 19, 2016, with machine generated English language translation, 15 pages.

* cited by examiner

VEHICLE SEAT

CROSS REFERENCE TO RELATED APPLICATIONS

This application is a National Stage Entry application of PCT Application No. PCT/JP2013/085253, filed Dec. 27, 2013, which claims the priority benefit of the following Japanese Patent Applications:

| Japanese Patent Application No. | Filing Date |
| --- | --- |
| 2012-288618 | Dec. 28, 2012 |
| 2013-045881 | Mar. 7, 2013 |
| 2013-085818 | Apr. 16, 2013 |
| 2013-086006 | Apr. 16, 2013 |
| 2013-115678 | May 31, 2013 |
| 2013-216450 | Oct. 17, 2013 | the contents of all being incorporated herein by reference.

BACKGROUND

Disclosed herein is a vehicle seat, and particularly a vehicle seat in which a seat cushion and a seat back are stowable at a stowed position formed on a vehicle body floor by pivoting pivot links coupled to the seat cushion.

Vehicle seats stowable at a stowed position formed on a vehicle body floor are already known. Among these vehicle seats, there is a vehicle seat corresponding to a rear seat of a vehicle, capable of being flipped up rearward and stowed in a recessed portion provided on the rear side of the vehicle body floor (for example, refer to Japanese Patent Document No. 4019456 B ("the '456 Document")).

As a mechanism for stowing the vehicle seat, a pivot link that couples the seat cushion of the vehicle seat and the vehicle body floor and is pivoted with respect to the vehicle body floor is known. By a pivot action of this pivot link, a seated portion including the seat cushion is moved toward the stowed position. In the vehicle seat described in the '456 Document, as shown in FIG. 30, two pivot links 100 are provided on the front side of the seat cushion and two pivot links 100 are provided on the rear side. At the time of stowing the seat, these pivot links 100 are pivoted with respect to the vehicle body floor in synchronization with each other.

In the stowable vehicle seat, normally, the plurality of pivot links 100 is provided as in the '456 Document. However, as a matter of course, these pivot links 100 are required to be arranged at positions such that the pivot links are not brought into contact with each other at the time of pivoting. For stowing of the vehicle seat, it is desirable to stow it compactly. However, a wider installment space has to be ensured depending on an arrangement layout of the plurality of pivot links 100. Thus, compactability of the vehicle seat in a stowed state is not easily realized.

At the time of arranging the plurality of pivot links 100, there is a need for considering a balance. For example, support rigidity by the pivot links 100 is desirably equalized between the one end side and the other end side in the width direction of the vehicle seat.

Regarding arrangement positions of the plurality of pivot links 100, the pivot links are required to be set at such positions that freedom of arrangement is ensured while compacting the vehicle seat in a stowed state, and further, contact between the pivot links 100 or contact between the pivot links 100 and other members are suppressed.

With constituent members of the vehicle, resource saving for environments and weight reduction for fuel efficiency improvement are desired. The pivot links 100 are actuated in accordance with stowing and takeoff of the vehicle seat, and high rigidity is required for long life.

A cushion frame serving as a framework of the seat cushion normally includes a pair of right and left side frames, a front portion coupling member that connects front ends of the right and left side frames, a rod shaped coupling pipe that connects rear ends of the side frames, and a pan frame bridged between upper surfaces of the front end portions of the side frames. Since the pan frame is provided, rigidity of the seat cushion can be maintained.

Since the pan frame covers a front end of the cushion frame up to the vicinity of center, there is a fear that a restriction is set on the design of a mechanism for moving the vehicle seat between a use position and the stowed position. Thus, contact with members forming the mechanism for moving the seat is required to be suppressed and freedom of design of a seat stowing mechanism is required to be increased.

In some vehicle seats stowable to the vehicle body floor side, a gas spring that couples the seat cushion and the vehicle body floor, the gas spring to be pivoted with respect to the vehicle body floor, is attached. The gas spring is formed in such a manner that bias force is always applied to the seat cushion side at the time of seat stowing operation. The gas spring supports the seat cushion from the lower side and assists the seat stowing operation.

When the gas spring biases the seat cushion upward at the time of the use position, seating stability of the seat is improved. However, there is not such a consideration that stowing stability of the seat is improved at the time of the stowed position by utilizing the gas spring.

SUMMARY

Therefore, a vehicle seat in which the stowing stability of the seat is improved at the time of a seat stowed state with a simple structure has been desired.

In the stowable vehicle seat, a space above the stowed seat is used as a place for loading cargo or the like. Therefore, by attaching the pan frame to a frame of a seat back forming a part of a floor surface in the vehicle to fill a storage recessed portion in a stowed state, rigidity required for a stowed state is given to the seat back. Linear members that couple right and left frame portions of a seat back frame main body formed into a rectangular frame shape are provided at three points between upper and lower frame portions so that rigidity of the seat back in a stowed state is further improved.

The linear members only extend in the horizontal direction between the upper and lower frame portions. Thus, further improvement of the rigidity of the seat back has been desired.

The seat disclosed herein is achieved in consideration of the above problems, and an object thereof is to provide a vehicle seat capable of providing a more compact stowed state while suppressing contact between pivot links.

Another object is to provide a vehicle seat in which a plurality of pivot links is arranged in a well-balanced manner so that support rigidity by the pivot links is equalized.

Still another object is to provide a vehicle seat capable of ensuring freedom of arrangement of pivot links while more compactly stowing the vehicle seat in a stowed state, and suppressing contact between the pivot links and contact between the pivot links and other members.

Yet another object is to save resources and reduce weight of a link structure for seat stowing and to also enhance rigidity of the link structure.

An object is to provide a vehicle seat stowable at a stowed position formed on a vehicle body floor in which a pan frame of a seat cushion does not disturb an action of another member used for stowing and developing actions of the vehicle seat.

Another object is to provide a vehicle seat stowable to the vehicle body floor side in which stowing stability of the seat is improved with a simple structure.

An object is to provide a stowable vehicle seat in which rigidity of a seat back is further improved with an uncomplicated configuration.

The above problems are solved by a vehicle seat stowable at a stowed position formed on a vehicle body floor, including first, second, and third links coupled to a seat cushion provided in the vehicle seat, the first, second, and third links to be pivoted with respect to the vehicle body floor in order to move the seat cushion to the stowed position, characterized in that the first, second, and third links are arranged at positions different from each other in the width direction of the vehicle seat, and the third link is arranged at a position different from the first and second links in the front to back direction of the vehicle seat.

In the above vehicle seat, the first, second, and third links are arranged at the positions different from each other in the width direction of the vehicle seat. Thus, contact between the pivot links is suppressed. In the above vehicle seat, the third link is arranged at the position different from the first and second links in the front to back direction of the vehicle seat. By displacing the arrangement position of one of the pivot links from the arrangement positions of the remaining two pivot links in such a way, the pivot links can be arranged while effectively utilizing a vehicle interior space. Thus, the vehicle seat in a stowed state can be stowed more compactly.

In the above vehicle seat, the third link may be arranged at a position rather close to the second link among the first and second links in the width direction, and at least one or more of length in the front to back direction, length in the width direction, and second moment of area of the first link may be greater than those of the second link.

With the above configuration, by arranging the third link close to the second link among the first link having greater size and the second link having smaller size, the plurality of pivot links can be arranged in a well-balanced manner so that support rigidity by the pivot links is equalized.

In the above vehicle seat, the arrangement position of the first link may be a position closer to center of the vehicle seat than the arrangement position of the second link in the width direction.

The first link is larger than the second link as described above. Thus, when the first link is arranged on the end side of the vehicle seat, the first link is easily brought into contact with a device placed beside the vehicle seat (such as an adjacent vehicle seat). When the first link is arranged at the position closer to the center of the vehicle seat, the contact between the first link and the device placed beside the vehicle seat can be suppressed.

The above vehicle seat may include a coupling portion that couples the first link and the second link. With such a configuration, rigidity of the second link is improved.

Further, in the above vehicle seat, the coupling portion may be one part of the second link. With such a configuration, without increasing the number of parts, the first link and the second link can be coupled to each other.

In the above vehicle seat, the first link may be arranged on the one end side of the seat cushion in the width direction, the second link may be arranged on the other end side of the seat cushion in the width direction, and the arrangement position of the third link may be a position closer to a side wall of a vehicle in which the vehicle seat is installed than the arrangement positions of the first and second links in the width direction.

As in the above configuration, the third link is arranged on the side wall side (that is, the outer side) of the vehicle with respect to the first link and the second link. Thus, without restriction by the first link and the second link, the arrangement position of the third link can be freely determined When the third link is arranged between both the links in the configuration where the coupling portion is provided between the first link and the second link, there is a possibility that the third link is brought into contact with the coupling portion. When the third link is arranged on the side wall side of the vehicle with respect to the first link and the second link, the contact between the third link and the coupling portion can be suppressed.

In the above vehicle seat, the third link may be a guide link that guides the seat cushion in such a manner that the seat cushion is moved to the stowed position along a predetermined trajectory, and a bias member to be pivoted with respect to the vehicle body floor together with the guide link while biasing the seat cushion may be provided at a position side by side with the guide link in the front to back direction.

With the above configuration, when the seat cushion goes toward the stowed position while being guided by the guide link, bias force is applied to the seat cushion from the bias member pivoted together with the guide link. Thereby, the guide link can smoothly move the seat cushion to the stowed position while being assisted by the bias force of the bias member.

In the above vehicle seat, a support member arranged between the vehicle body floor and the seat cushion, the support member supporting the seat cushion may be provided, in a case where two vehicle seats are provided side by side along the width direction, the first, second, and third links and the support member may be provided for each of the vehicle seats, and at least one of the two vehicle seats may include the support member placed between the first link and the second link in the width direction, and the support member placed between the first links of the separate vehicle seats.

With the above configuration, the support member is placed between the first link and the second link in the width direction of the vehicle seat. Thus, contact between the support member and the pivot links can be suppressed.

At least one of the vehicle seats includes the support member placed between the first links of the separate vehicle seats in addition to support member placed between the first link and the second link. Thus, a support state of the vehicle seat is more stabilized. Further, the support member placed between the first links of the separate vehicle seats is arranged at a position where contact with the first links is suppressed. Thus, the support member does not easily cause trouble when each of the vehicle seats is individually stowed.

In the above vehicle seat, the first link may have a closed section structure.

With the above configuration, resources are saved, weight is reduced, and high rigidity is obtained.

In the above vehicle seat, a seatbelt anchor may be fixed to the first link.

With the above configuration, by attaching the seatbelt anchor to the first link having the highly-rigid closed section structure, fixing of the seatbelt anchor to the vehicle seat is stabilized.

In the above vehicle seat, a coupling portion that couples parts of the first link and the second link on the one end side in the extending direction may be provided, and at least a part of the coupling portion may be fixed in a state where the part is housed in an end portion of the first link on the vehicle body floor side.

With the above configuration, by coupling the first link and the second link to each other, rigidity of both the links is improved. A coupling part between the first coupling portion and the first link is more compact.

In the above vehicle seat, the seat cushion may include a framework shaped seat cushion frame, and a pan frame provided in a front portion of a region partitioned by the seat cushion frame, a support leg whose one end side is fixed to the seat cushion, the support leg supporting the seat cushion at a use position and being brought into a state where the seat cushion is not supportable at the stowed position may be provided, and the pan frame may be arranged to avoid a support leg attachment portion that couples the support leg to the seat cushion frame.

With the above configuration, the pan frame supports the seat cushion at the use position and contact with the support leg attachment portion that couples the support leg to be brought into a state where the seat cushion is not supportable at the stowed position can be suppressed. While suppressing contact with a device relating to rotation of the support leg, rigidity of a front portion of the seat cushion frame can be ensured. Thus, the stowable vehicle seat including the highly-rigid seat cushion frame can be realized.

The above vehicle seat may include a bias member whose one end side is attached to the seat cushion and other end side is coupled to the vehicle body floor, the bias member biasing the seat cushion downward or in the horizontal direction at the stowed position.

With the above configuration, when the bias member that biases the seat cushion downward particularly at the time of the stowed position is provided, backlash of the seat cushion forming the seat main body can be suppressed to bring stabilization at the time of the stowed position.

The above vehicle seat may include a seat back frame including a pair of vertical frame portions that extend along the up and down direction in a side portion of the vehicle seat, and a pair of horizontal frame portions that respectively couple upper end sides and lower end sides of the pair of vertical frame portions, a pan frame fixed to the seat back frame, the pan frame extending in a region partitioned by the seat back frame, a linear member fixed to one surface of the pan frame and bridged to couple the pair of vertical frame portions, an input portion to which an operation move of an operator for moving the vehicle seat between the use position and the stowed position of the vehicle seat is transmitted, and a transmission device that transmits the move transmitted to the input portion to a movement device that moves the vehicle seat between the use position and the stowed position, and the transmission device may be abutted with the linear member.

With the above configuration, since the transmission device is abutted with the linear member, rigidity of the linear member is improved. As a result, rigidity of the pan frame is improved.

According to various embodiments of the present invention, while suppressing the contact between the pivot links, the vehicle seat in a stowed state can be more compact.

According to various embodiments of the present invention, the plurality of pivot links can be arranged in a well-balanced manner so that the support rigidity by the pivot links is equalized.

According to various embodiments of the present invention, the contact between the first link and the device placed beside the vehicle seat can be suppressed.

According to various embodiments of the present invention, the rigidity of the second link is improved.

According to various embodiments of the present invention, without increasing the number of parts, the first link and the second link can be coupled to each other.

According to various embodiments of the present invention, freedom of the arrangement position of the third link is improved, and the contact between the coupling portion that couples the first link and the second link and the third link can be suppressed.

According to various embodiments of the present invention, the guide link is assisted by the bias force of the bias member and can smoothly move the seat cushion to the stowed position.

According to various embodiments of the present invention, the support state of the vehicle seat is more stabilized, and the contact between the support member placed between the first links of the separate vehicle seats and the first link is suppressed so that the support member does not easily cause trouble when each of the vehicle seats is individually stowed.

According to various embodiments of the present invention, regarding the first link, the resources can be saved, the weight can be reduced, and the rigidity can be enhanced.

According to various embodiments of the present invention, the fixing of the seatbelt anchor to the vehicle seat can be stabilized.

According to various embodiments of the present invention, by coupling the first link and the second link to each other, the rigidity of both the links is improved, and the coupling part between the first coupling portion and the first link is more compact.

According to various embodiments of the present invention, the pan frame supports the seat cushion at the use position and the contact with the support leg attachment portion that couples the support leg to be brought into a state where the seat cushion is not supportable at the stowed position can be suppressed. While suppressing the contact with the device relating to the rotation of the support leg, the rigidity of the front portion of the seat cushion frame can be ensured. Thus, the stowable vehicle seat including the highly-rigid seat cushion frame can be realized.

According to various embodiments of the present invention, the backlash of the seat cushion forming the seat main body can be suppressed to bring stabilization at the time of the stowed position.

According to various embodiments of the present invention, since the transmission device is abutted with the linear member, the rigidity of the linear member is improved. As a result, the rigidity of the pan frame is improved.

BRIEF DESCRIPTION OF THE DRAWINGS

Various embodiments of the invention are presented in the following drawings.

DETAILED DESCRIPTION

Schematic Configuration of Vehicle Seat According to one Embodiment of the Present Invention Hereinafter, a vehicle seat according to the present embodiment will be described with reference to the drawings.

In the following description, the front to back direction indicates the front to back direction (longitudinal direction) of a vehicle and corresponds to the front to back direction of the vehicle seat. The width direction indicates the right and left direction (lateral direction) of the vehicle and corresponds to the width direction of the vehicle seat.

Positions, postures, and the like of members described below are positions, postures, and the like when the vehicle seat is in a use state, that is, a seated state unless otherwise particularly specified.

Figure 1:
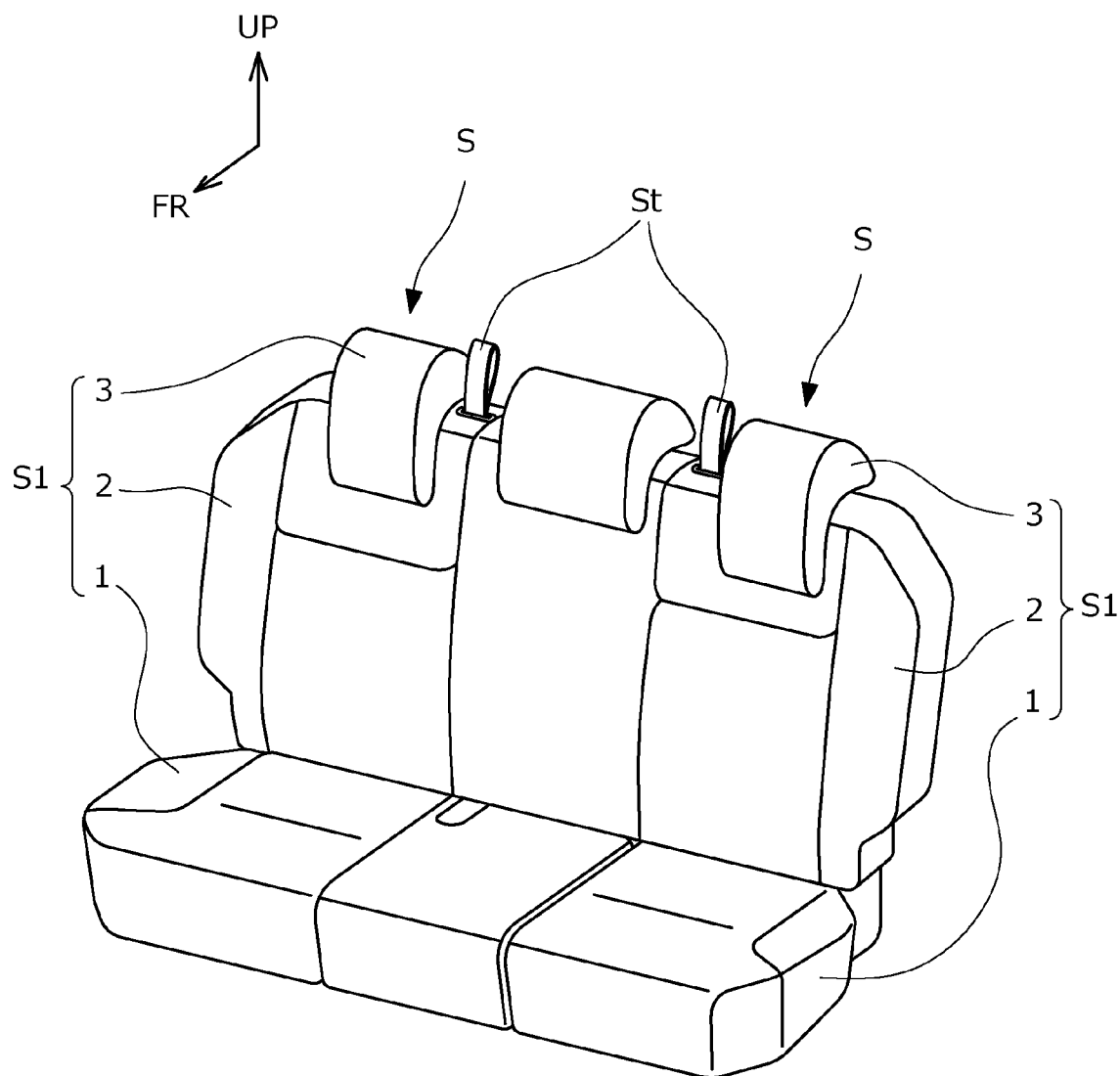
FIG. 1 is a perspective view of an outer appearance view of a vehicle seat of an embodiment of the present invention.

Vehicle seats S according to the present embodiment form a rear seat of the vehicle, and in the present embodiment, two seats are arranged side by side in the width direction as shown in FIG. 1. Lateral width (length in the width direction) is different between the two seats S placed side by side in the width direction. In the present embodiment, a ratio of the lateral width is set to be about 4:6. However, the present invention is not limited to this but the ratio of the lateral width can be arbitrarily set and may be 5:5, for example.

Figure 2:
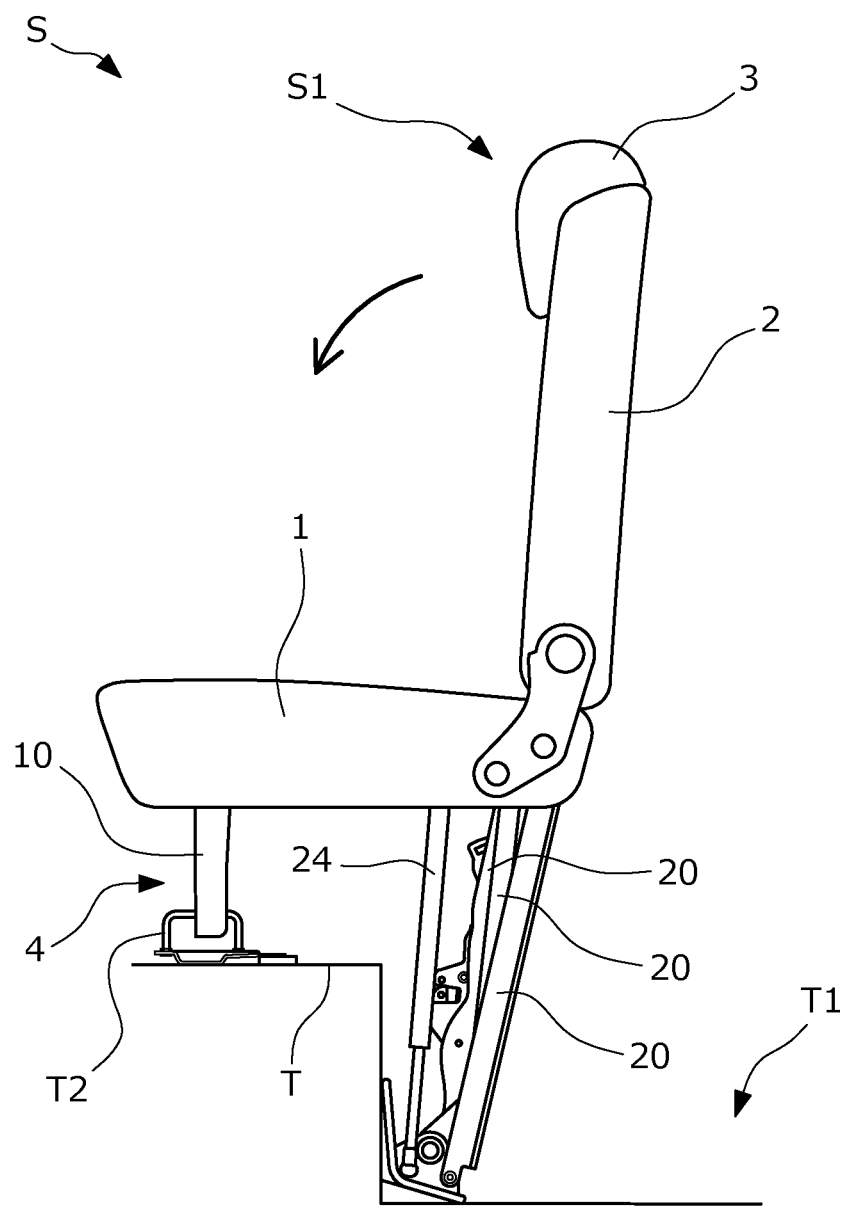
FIG. 2 is a side view showing a first state where the vehicle seat is stowed.

Each of the two seats S placed side by side in the width direction includes a seated portion S1. The seated portion S1 includes a seat cushion 1 on which a passenger is seated, a seat back 2 that supports the passenger from the back side, and a headrest 3 that supports a head portion of the passenger. As shown in FIG. 2 and the like, a recessed stowing space Ti formed on a vehicle body floor T is provided on the rear side of the seat S. An interior of this stowing space T1 corresponds to a stowed position. The seat S is formed to be stowable in the stowing space T1.

Figure 3:
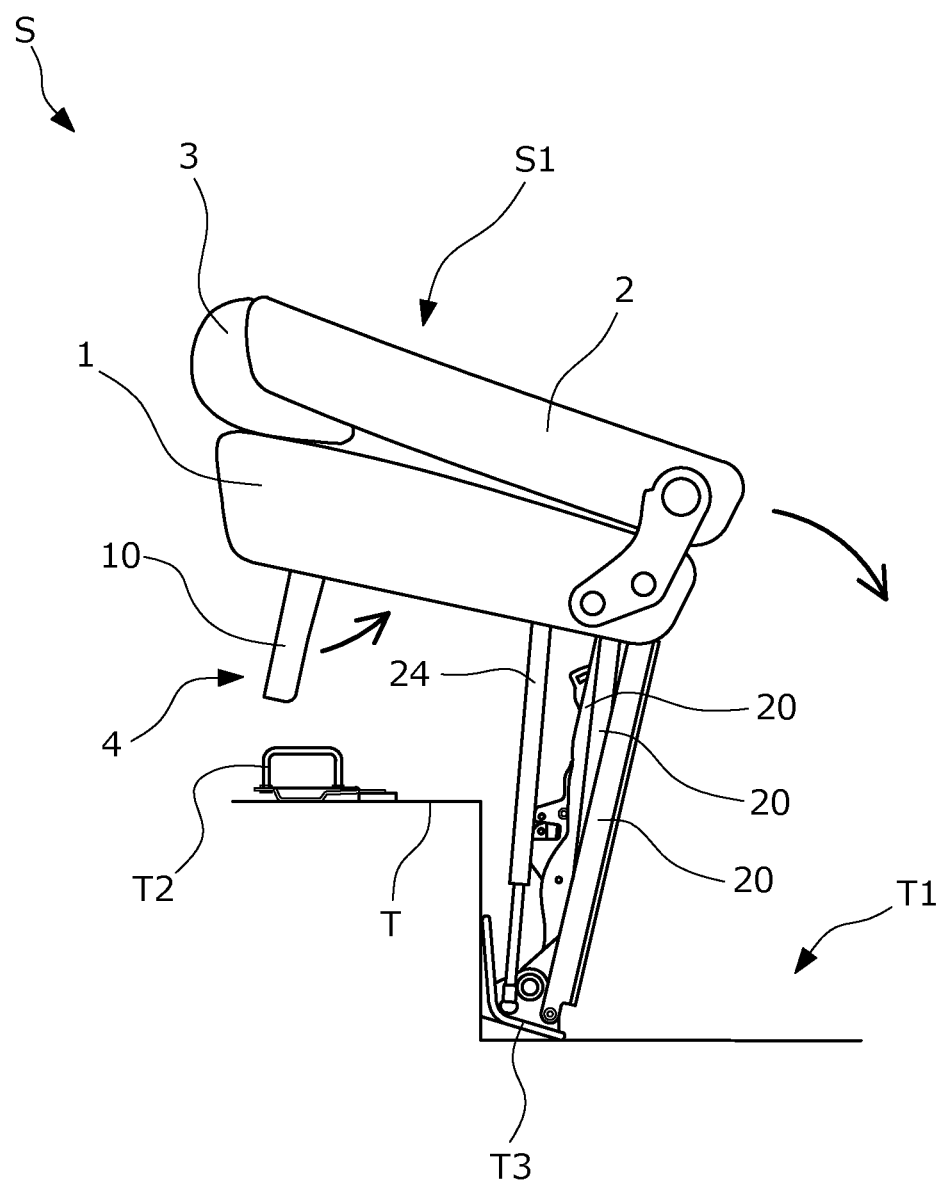
FIG. 3 is a side view showing a second state where the vehicle seat is stowed.
Figure 4:
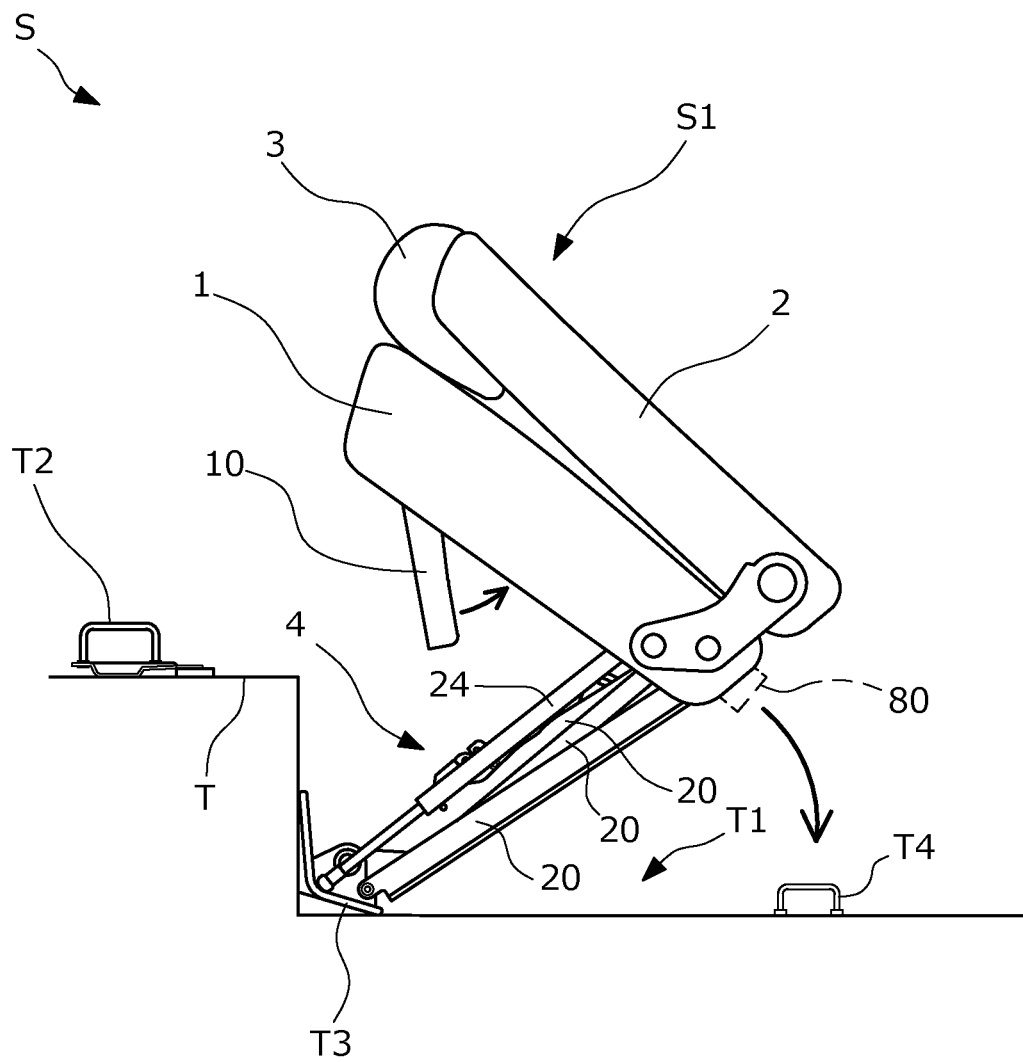
FIG. 4 is a side view showing a third state where the vehicle seat is stowed.
Figure 5:
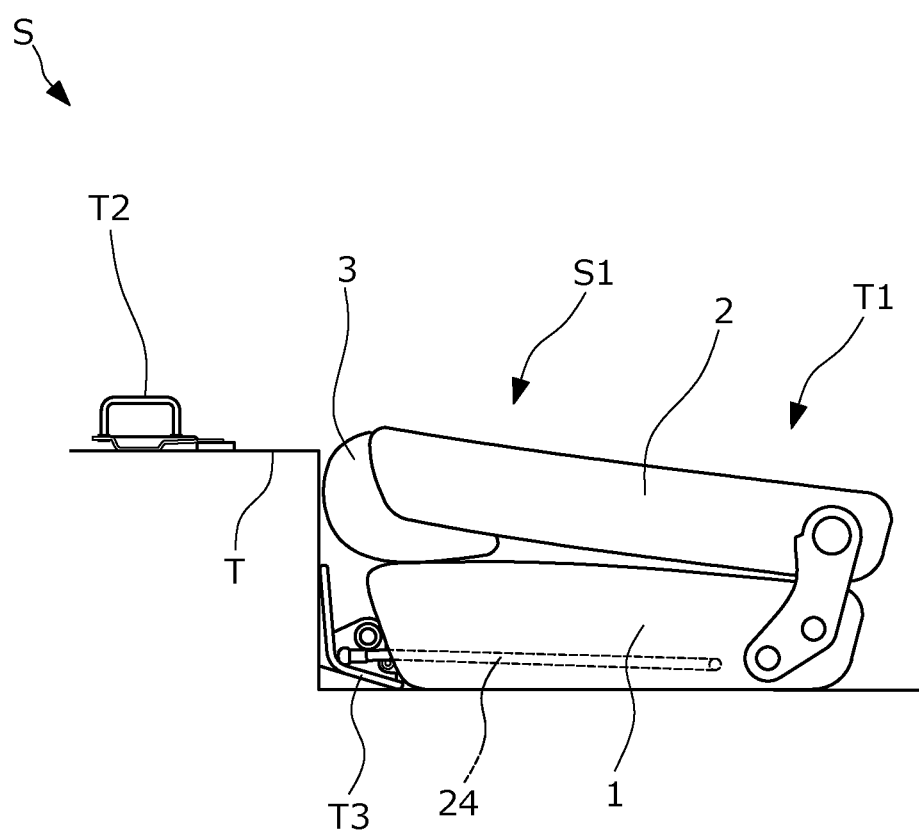
FIG. 5 is a side view showing a fourth state where the vehicle seat is stowed.

An overview of a stowing action of the seat S will be described. When the passenger pulls an operation strap St shown in FIG. 1 while the seat S is in a state before stowing, that is, in a seating state shown in FIG. 2, the seat back 2 is inclined forward so that the seated portion S1 is folded. After that, the folded seated portion S1 is moved in the direction in which the seated portion is sunk rearward as shown in FIGS. 3 and 4. At the end, the entire seat S is stored in the stowing space T1 as shown in FIG. 5.

The seat S includes a seat stowing mechanism 4 in a lower portion of the seated portion S1 in order to realize the above stowing action. This seat stowing mechanism 4 is a mechanism for moving the seated portion Si toward the interior of the stowing space T1, and includes a foot link 10 and pivot links 20 shown in FIG. 2 and the like as major constituent elements.

The foot link 10 corresponds to a support member, and is arranged between the vehicle body floor T and the seat cushion 1 and supports the seated portion S1 including the seat cushion 1. This foot link 10 includes a first lock mechanism 11 shown in FIG. 10 and the like to face the lower side in a lower end portion, and is engaged with a striker T2 attached onto the vehicle body floor T and shown in FIG. 10 and the like. Since the foot link 10 is engaged with the striker T2, the seated portion Si is locked in a state where the seated portion is placed at a seating position. On the other hand, when an engagement state between the foot link 10 and the striker T2 is canceled, the entire seat S including the seated portion S1 is movable, and can be moved toward the interior of the stowing space T1.

The engagement state between the foot link 10 and the striker T2 is canceled by a switching mechanism (not shown). The switching mechanism is actuated when the seated portion Si is brought into a predetermined posture, more specifically when the seat back 2 is inclined forward and reaches a predetermined position.

A configuration of the foot link 10 will be described in detail later.

Figure 10:
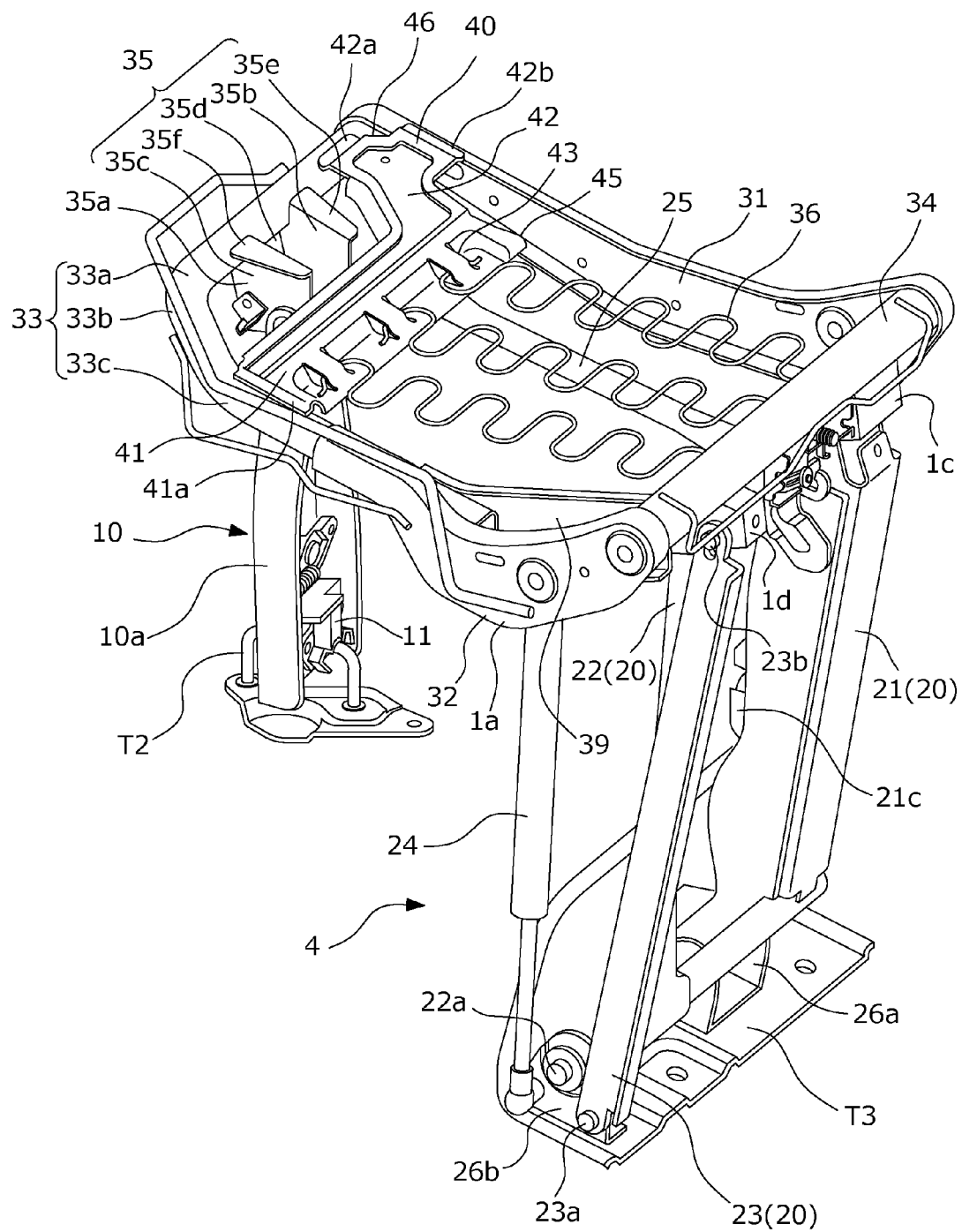
FIG. 10 is an oblique rear perspective view of the seat stowing mechanism.

The pivot links 20 are elongated members, and one end portion (upper end portion) thereof in the extending direction is coupled to the seat cushion 1, more specifically to a seat cushion frame 1a serving as a framework of the seat cushion 1 shown in FIG. 10 and the like. The other end portion (lower end portion) of the pivot links 20 in the extending direction is axially supported to be pivotable with respect to the vehicle body floor T. In a state where the engagement state between the foot link 10 and the striker T2 is canceled and when the pivot links 20 are pivoted to be inclined rearward, the seated portion S1 is moved toward the interior of the stowing space T1. That is, the pivot links 20 are pivoted with respect to the vehicle body floor T in order to move the seated portion Si between the seating position and a stowed position.

A configuration of the pivot links 20 will be described in detail later.

Figure 6:
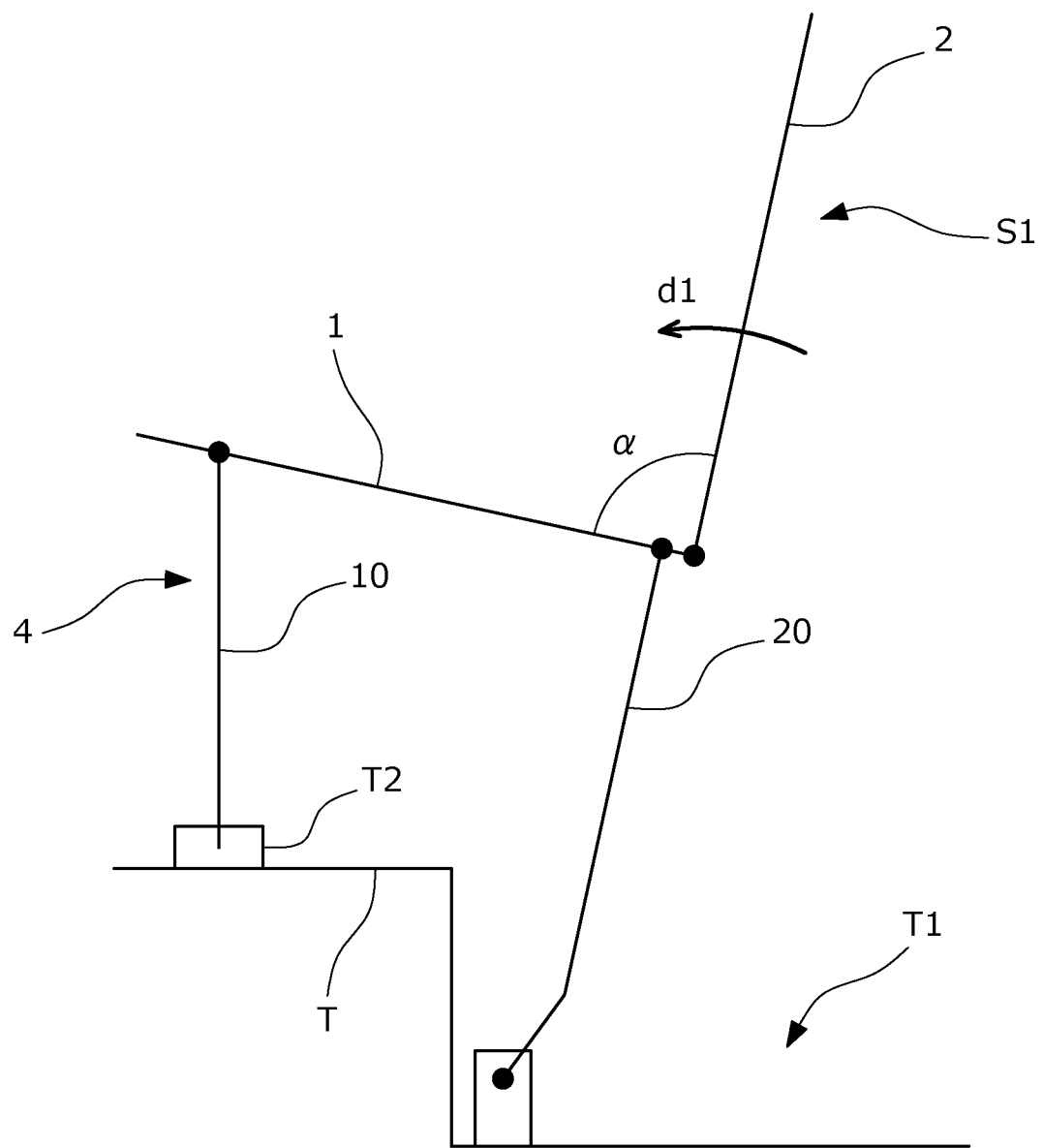
FIG. 6 is a schematic view for illustrating a move of a seat stowing mechanism from the first state to the second state.
Figure 7:
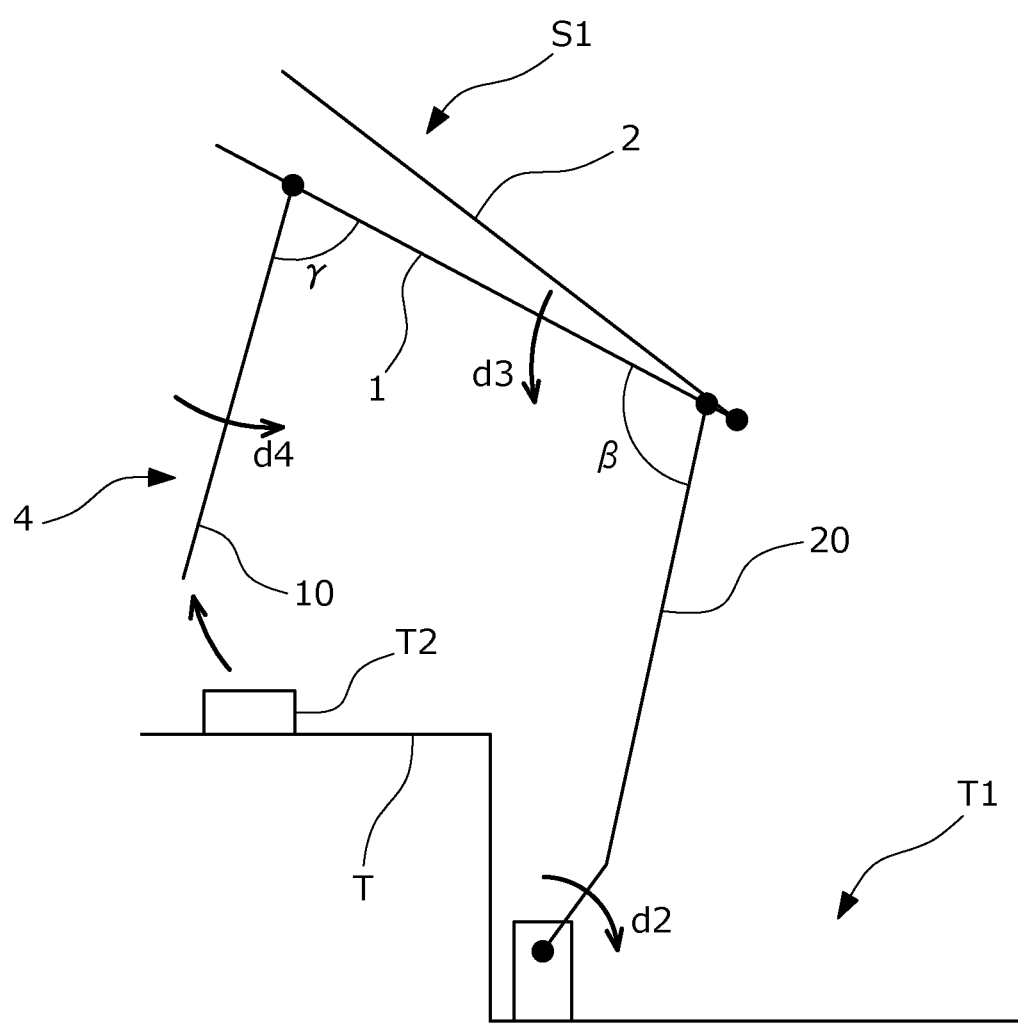
FIG. 7 is a schematic view for illustrating a move of the seat stowing mechanism from the second state to the third state.
Figure 8:
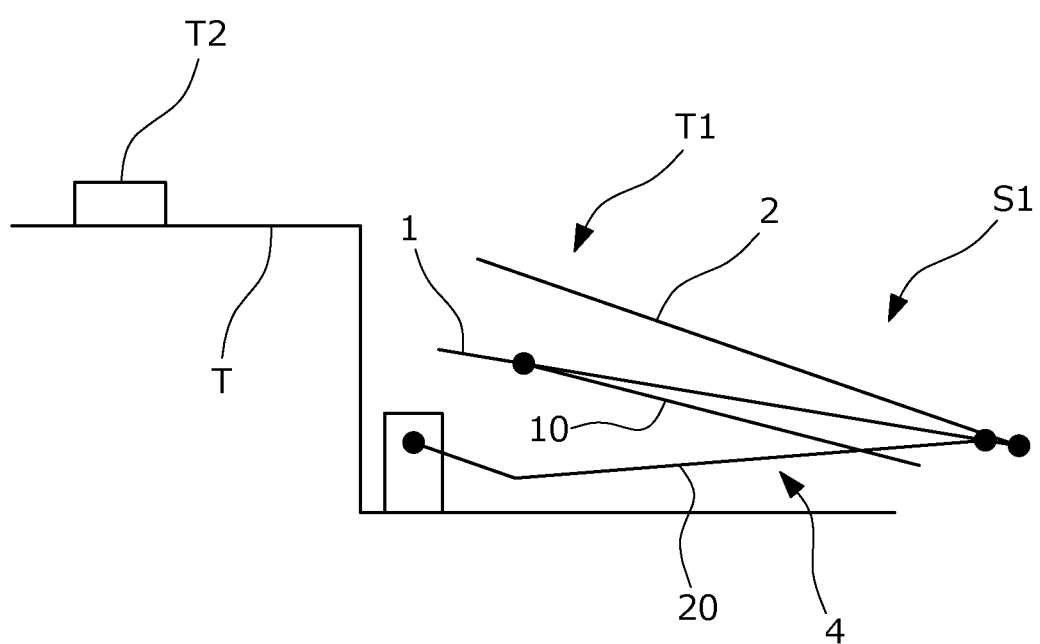
FIG. 8 is a schematic view for illustrating a move of the seat stowing mechanism from the third state to the fourth state.

Hereinafter, an overview of an action example of the seat stowing mechanism 4 will be described with reference to FIGS. 6 to 8. In FIGS. 6 to 8, the portions of the seat stowing mechanism 4 and the seated portion Si are schematically shown with lines. In FIGS. 6 to 8, black dots show pivot centers.

Firstly, when the passenger pulls the operation strap St shown in FIG. 1 while the seat S is in a seating state, the seat back 2 is inclined forward as described above. That is, the seat back 2 is pivoted with respect to the seat cushion 1 in the direction shown by the reference sign d1 in FIG. 6.

When an angle made by the seat back 2 and the seat cushion 1 (angle shown by the reference sign a in FIG. 6) becomes as small as a predetermined angle, the switching mechanism (not shown) is actuated in conjunction with this, and the engagement state between the striker T2 attached onto the vehicle body floor T and the foot link 10 is cancelled. At this time, as shown in FIG. 7, a front end portion of the seat cushion 1 is brought slightly upward by bias force of a piston damper 24 to be described later.

When the engagement state between the striker T2 and the foot link 10 is cancelled, as described above, the seated portion S1 becomes movable. When the pivot links 20 are inclined rearward in such a state, the seated portion Si in a folded state is moved toward the stowing space T1. That is, when the pivot links 20 are pivoted with respect to the vehicle body floor T in the direction shown by the reference sign d2 in FIG. 7, the seated portion S1 is lowered while being carried around to the rear side.

The seated portion Si itself can be pivoted with respect to the pivot links 20 in the direction shown by the reference sign d3. Thereby, when lowered while being carried around to the rear side, the seated portion S1 is pivoted at the same time in such a manner that an angle made by the seat cushion 1 and the pivot links 20 (angle shown by the reference sign β in FIG. 7) becomes small.

Further, the pivot links 20 and the foot link 10 are coupled by an intermediary member 25 shown in FIG. 10, 18 and the like. Since the intermediary member 25 is placed between the pivot links 20 and the foot link 10, pivoting of the pivot links 20 is transmitted to the foot link 10. As a result, when the pivot links 20 are inclined rearward, the foot link 10 is pivoted to be folded. That is, the foot link 10 is pivoted in the direction shown by the reference sign d4 in FIG. 7 in conjunction with the rearward inclination action of the pivot links 20. As the pivot action progresses, an angle made by the foot link 10 and the seat cushion 1 (angle shown by the reference sign γ in FIG. 7) becomes small.

At a time point when the pivot links 20 are inclined rearward to finally reach a predetermined position (specifically, the position of the pivot links 20 shown in FIG. 8), the seated portion S1 in a folded state and the foot link 10 are stowed in the stowing space T1 together with the pivot links 20. At this time, the foot link 10 and the pivot links 20 are housed inside the seat cushion 1 (more specifically, the seat cushion frame 1a) in the width direction.

Configuration of Seat Cushion Frame

Next, a configuration of the seat cushion frame 1a will be described in detail with reference to FIGS. 9 to 13.

Figure 12:
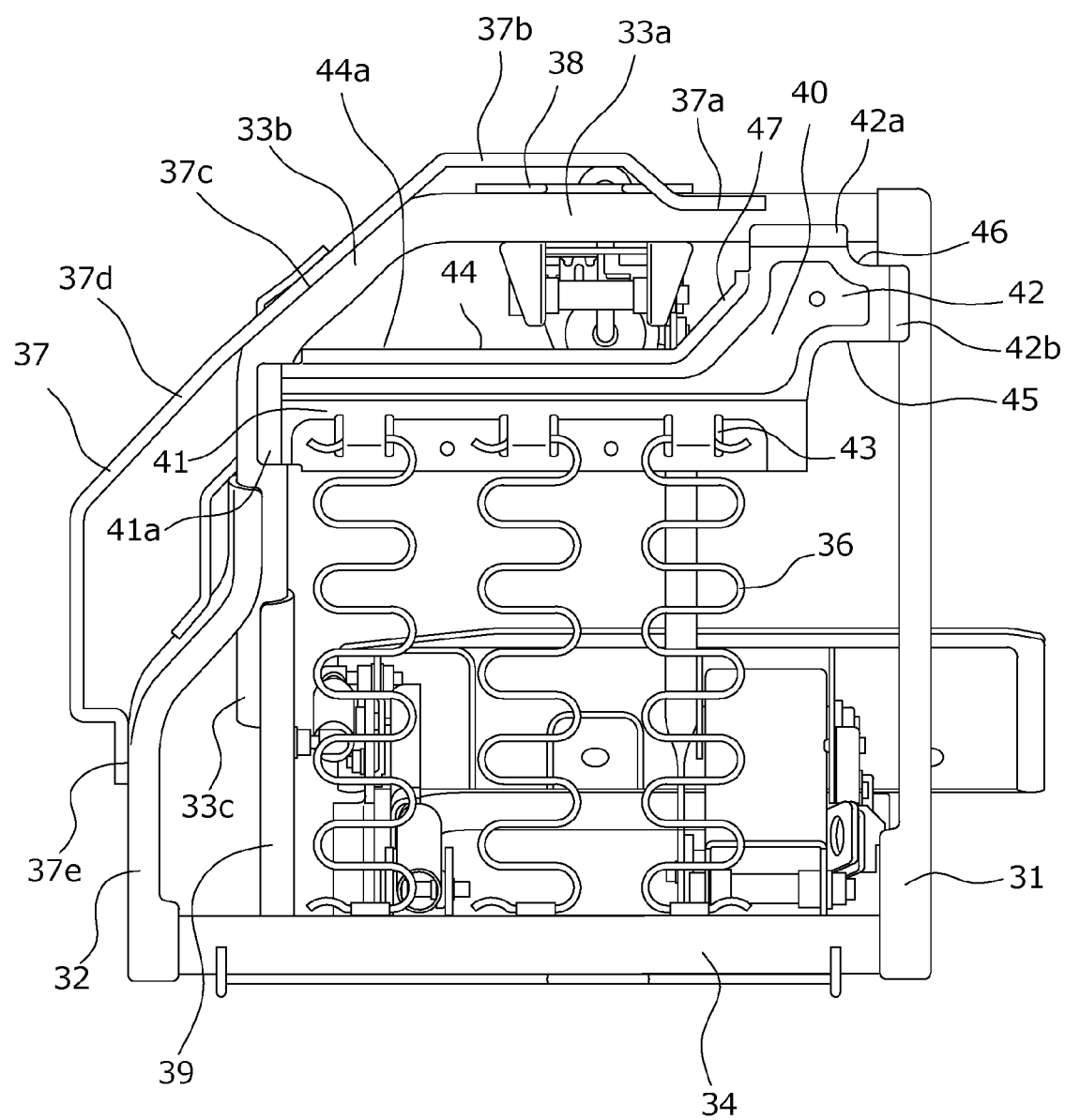
FIG. 12 is an illustrative plan view of a seat cushion frame.
Figure 13:
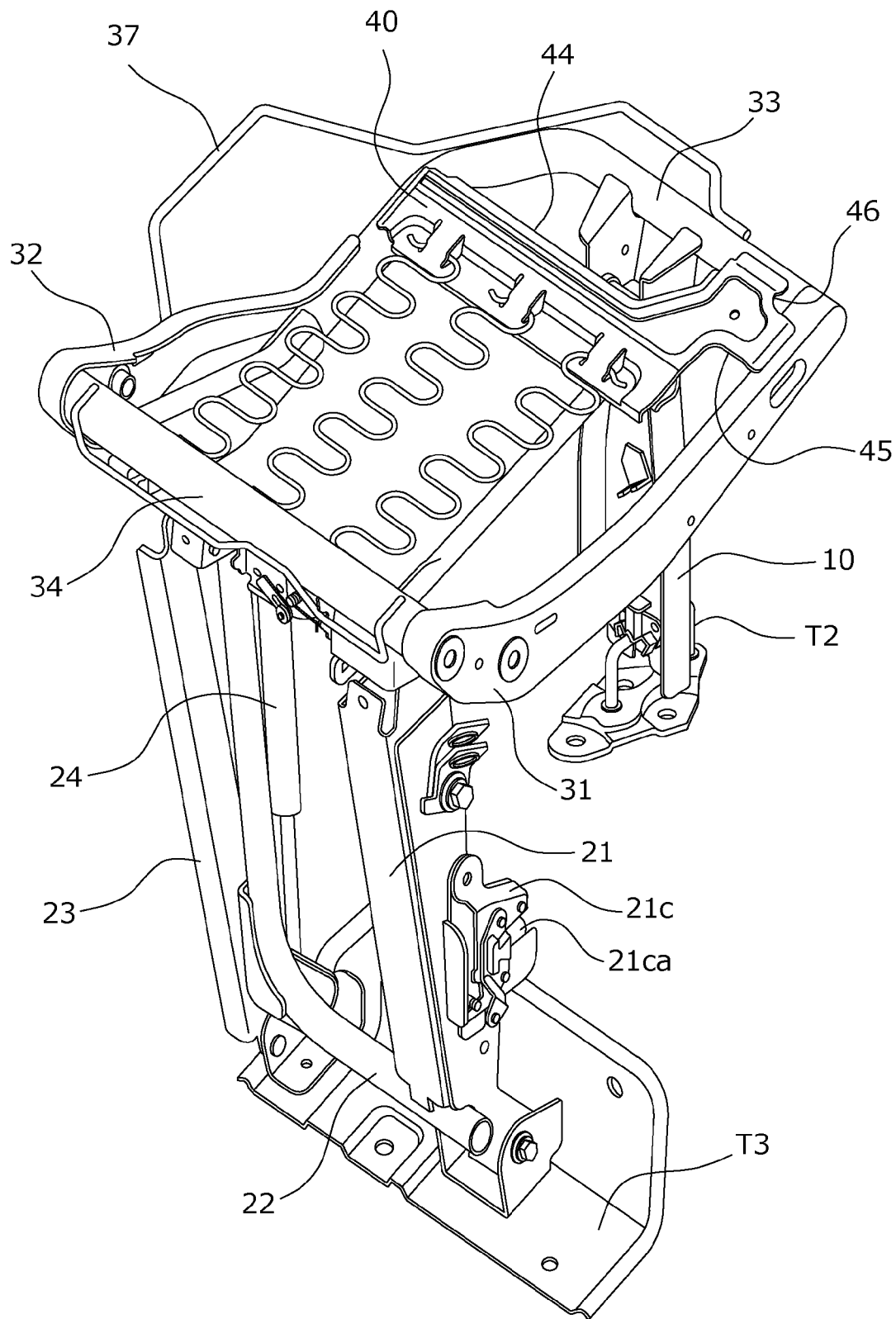
FIG. 13 is an oblique rear perspective view of the seat stowing mechanism from another angle.

The seat cushion 1 of FIG. 1 is formed by mounting a known cushion pad onto the seat cushion frame 1a shown in FIGS. 10, 12, and 13 and further covering with a known skin material.

The seat cushion frame 1a is formed into a frame shape by an inner-side side frame 31 and a door-side side frame 32 arranged to be separated from each other in the right and left direction, the side frames extending in the front to back direction, a pipe shaped front frame 33 that couples front ends of the inner-side side frame 31 and the door-side side frame 32, and a rear frame 34 that couples rear ends of the inner-side side frame 31 and the door-side side frame 32.

The inner-side side frame 31 and the door-side side frame 32 are substantially plate shaped bodies formed by pressing sheet metal so that a front portion is wider than a rear portion and a center portion is curved to project downward. The door-side side frame 32 is formed to be shorter in the front to back direction than the inner-side side frame 31.

The inner-side side frame 31 and the door-side side frame 32 are respectively arranged on the vehicle interior inner side and the vehicle interior outer side of the vehicle of the seat S.

The front frame 33 is made of a substantially L shaped body formed by bending a metal pipe, and as shown in FIGS. 10, 12, and 13, includes a front portion 33a, an inclined portion 33b bent rearward from the front portion 33a by an obtuse angle, and a side portion 33c bent further rearward from the inclined portion 33b by an obtuse angle.

On the rear end side of the side portion 33c of the front frame 33, an auxiliary frame 39 formed by pressing sheet metal to have a substantially C shaped section and arranged to extend in the front to back direction of the seat is welded and fixed. The auxiliary frame 39 includes a center surface formed to be substantially flat and upper and lower flange surfaces that are upper and lower ends of this center surface projecting toward the vehicle door side. The auxiliary frame is welded and fixed in such a manner that the center surface and the pair of flange surfaces wrap the rear end portion side of the front frame 33.

A rear end of the auxiliary frame 39 is fixed to the rear frame 34.

A fixing bracket 35 for attaching the foot link 10 is fixed to the front portion 33a.

Figure 11:
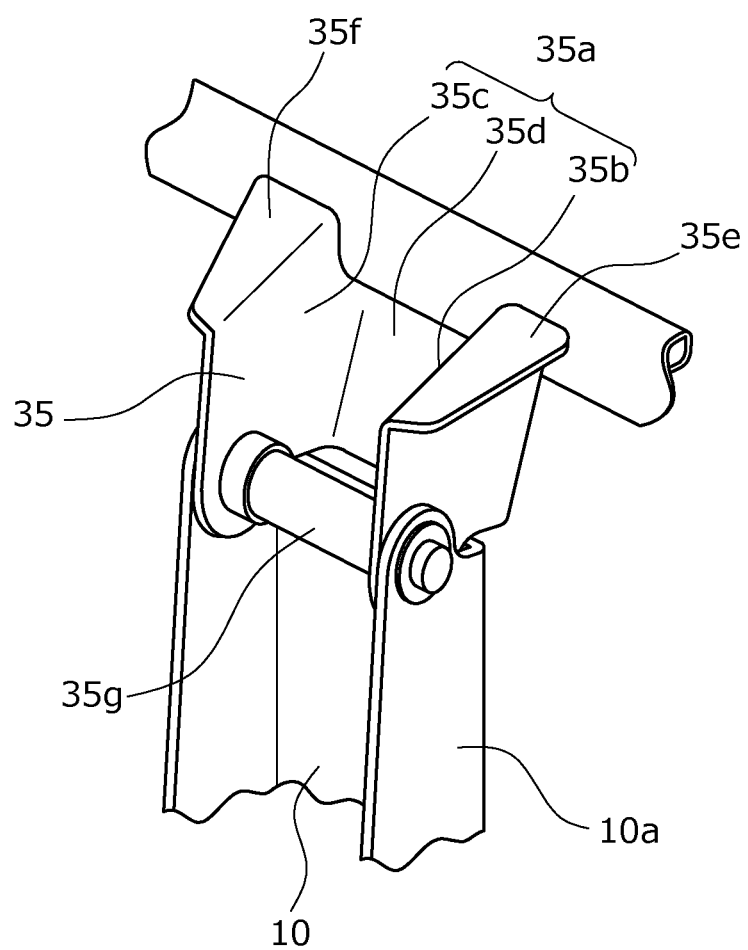
FIG. 11 is a perspective view of a fixing bracket of the seat stowing mechanism.

The fixing bracket 35 is formed by bending a metal plate into a substantially U shape. As shown in FIGS. 10 to 11, the fixing bracket 35 includes an U shaped main body portion 35a in which front ends of a pair of lateral plates 35b, 35c extending in the up and down direction and in the front to back direction are coupled by a front plate 35d, a pivot shaft 35g fixed to the lower end side of the lateral plates 35b, 35c of the main body portion 35a, and flange portions 35e, 35f bent from upper ends of the lateral plates 35b, 35c, the flange portions extending toward the outer side in the width direction.

Since an upper end portion of the foot link 10 is supported on the pivot shaft 35g, the foot link 10 is formed to be pivotable with respect to the seat cushion frame 1a.

As shown in FIGS. 10 to 11, the flange portions 35e, 35f are formed within a range of the height direction of the front portion 33a in such a manner that upper surfaces of the flange portions 35e, 35f substantially continue to the front portion 33a. Each of the flange portions 35e, 35f is formed into a substantially trapezoidal shape in such a manner that a rear portion is narrower than a front portion and a rear portion of an end portion on the outer side in the width direction is placed closer to the side of the lateral plates 35b, 35c than a front portion.

Front and rear corner portions on the outer side in the width direction of the flange portions 35e, 35f are formed into a rounded shape.

A pan frame 40 is provided in a front portion of the seat cushion frame 1a.

The pan frame 40 is bridged between the inner-side side frame 31 and the front frame 33.

The pan frame 40 is made of a substantially plate shaped metal body formed into a substantially L shape in which a right-left extending portion 41 extending in the right and left direction, whose end portion 41a on the outer side in the width direction is fixed to the side portion 33c of the front frame 33, and a front-back extending portion 42 extending in the front to back direction, whose end portion 42a on the front side and whose end portion 42b on the inner side in the width direction are respectively fixed to the front portion 33a of the front frame 33 and the inner-side side frame 31 continue to each other on the rear inner side and are integrated with each other.

Three locking holes 43 for locking three S springs 36 bridged from the rear frame 34 are provided in a rear portion of the right-left extending portion 41.

A region surrounded by the L shaped right-left extending portion 41 and the front-back extending portion 42 serves as a cut-away portion 44. In this region of the cut-away portion 44, that is, in the region surrounded by the right-left extending portion 41, the front-back extending portion 42, the front portion 33a, and the inclined portion 33b, the fixing bracket 35 is provided.

A part where the right-left extending portion 41 and the front-back extending portion 42 continue to each other is formed to be an oblique side 47 made by inclining a side on the side of the cat-away portion 44 with respect to the right-left extending portion 41 and the front-back extending portion 42.

In the front-back extending portion 42, although the end portions 42a, 42b are fixed to the front frame 33 and the inner-side side frame 31 on the front side of the center, a rear part of the end portion 42b is cut away into a rectangular shape at a cut-away portion 45. In a region of the cut-away portion 45, the front-back extending portion 42 is separated from the inner-side side frame 31.

The cut-away portion 45 is the region where a third lock mechanism 21c of the pivot links 20 is placed when the seat S is in a stowed state. By providing the cut-away portion 45, contact with the third lock mechanism 21c is suppressed in a stowed state.

An end portion 44a on the front side and on the seat outer side in a part ranging from the right-left extending portion 41 to the front-back extending portion 42 through the oblique side 47 is bent downward and formed to be lower than other parts of the pan frame 40. The end portion 44a is a part placed along the cut-away portion 44.

A corner portion of an inner front end portion of the front-back extending portion 42, which is a region between the end portion 42a and the end portion 42b is cut away into a substantially rectangular shape so that a cut-away portion 46 is formed.

As shown in FIGS. 10, 12, and 13, a first wire member 37 is provided to range from a position of the front portion 33a of the front frame 33 on the slightly vehicle inner side of the fixing bracket 35 in the width direction to the door-side side frame 32.

The first wire member 37 is made of an integrated linear steel member, including a front portion fixing portion 37a welded and fixed to the front portion 33a of the front frame 33, an inclined portion fixing portion 37c welded and fixed to the inclined portion 33b of the front frame 33, a frame fixing portion 37e welded and fixed to the door-side side frame 32, a front portion 37b extending between the front portion fixing portion 37a and the inclined portion fixing portion 37c, and a side portion 37d extending between the inclined portion fixing portion 37c and the frame fixing portion 37e.

The front portion fixing portion 37a and the inclined portion fixing portion 37c are attached to a front-oblique upper surface of the front portion 33a of the front frame 33 and a front-oblique upper surface of the inclined portion 33b.

The front portion 37b of the first wire member 37 is bent obliquely forward from the front portion fixing portion 37a, bent again including a part parallel with the front portion 33a of the front frame 33, bent one more time obliquely rearward from the part parallel with the front portion 33a, and abutted with the inclined portion 33b of the front frame 33 to extend.

The inclined portion fixing portion 37c is provided in this part abutted with the inclined portion 33b.

The frame fixing portion 37e is attached to a side surface of the door-side side frame 32.

The side portion 37d of the first wire member 37 extends in the direction along the inclined portion 33b of the front frame 33 and projects to the outer side in the width direction of the front frame 33 and the door-side side frame 32. After the side portion is bent perpendicularly inward at a position on the outer side of the door-side side frame 32 to extend toward the side of the door-side side frame 32, the side portion is perpendicularly bent again at a position where the side portion is abutted with the side surface of the door-side side frame 32, and the frame fixing portion 37e is attached to the side surface of the door-side side frame 32 at a position where the side portion extends along the side surface of the door-side side frame 32.

The first wire member 37 is provided along a part of the front frame 33 adjacent to the cut-away portion 44, and improves support rigidity of the front frame 33.

As shown in FIG. 12, a linear second wire member 38 is provided on a front surface of the front portion 33a of the front frame 33 along the part where the fixing bracket 35 is provided.

Configuration of Seat Back Frame

Next, a configuration of the seat back frame 2a serving as a framework of the seat back 2 will be described in detail with reference to FIGS. 9, 14 to 17.

Figure 14:
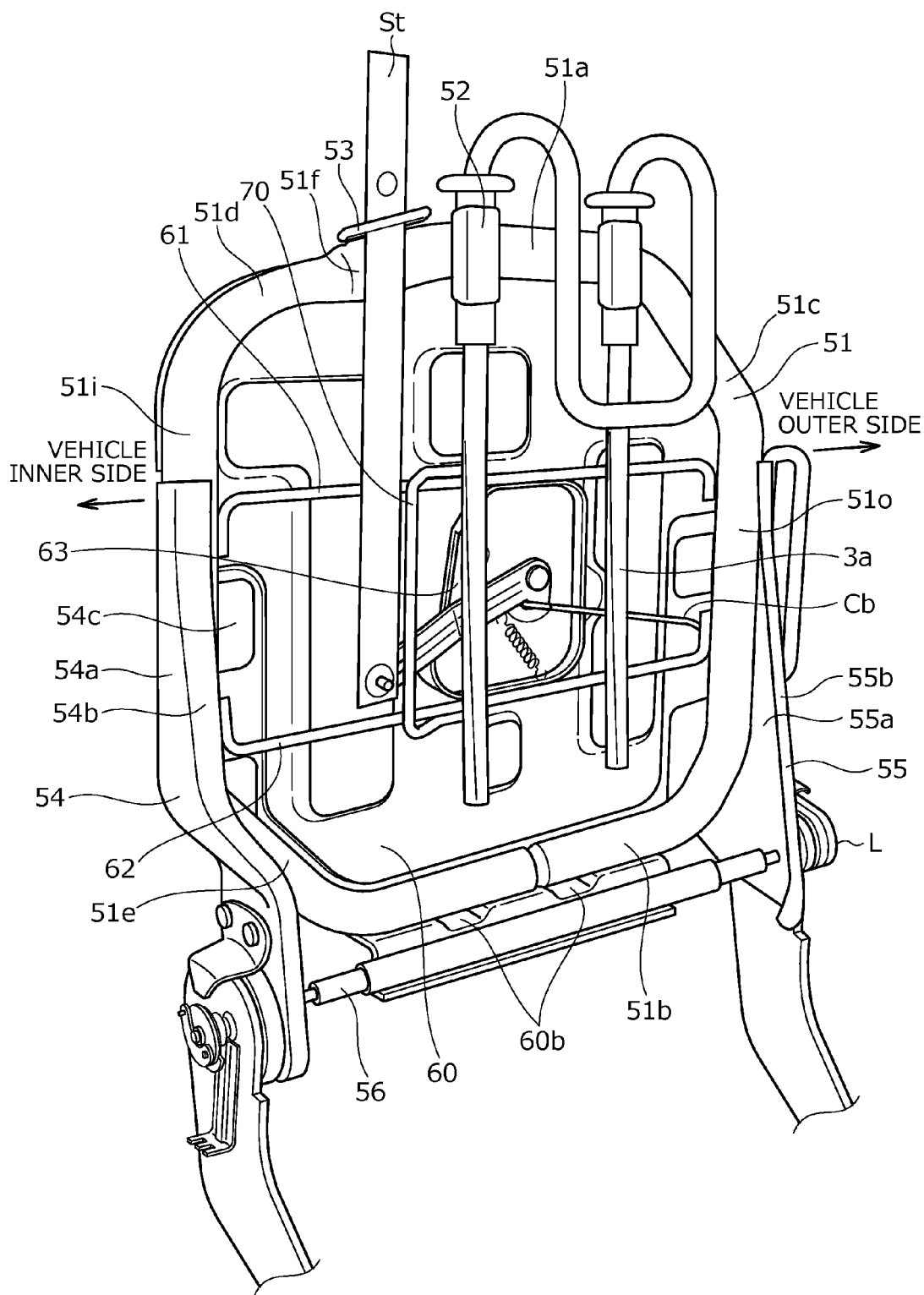
FIG. 14 is an oblique front perspective view of a seat back frame.
Figure 15:
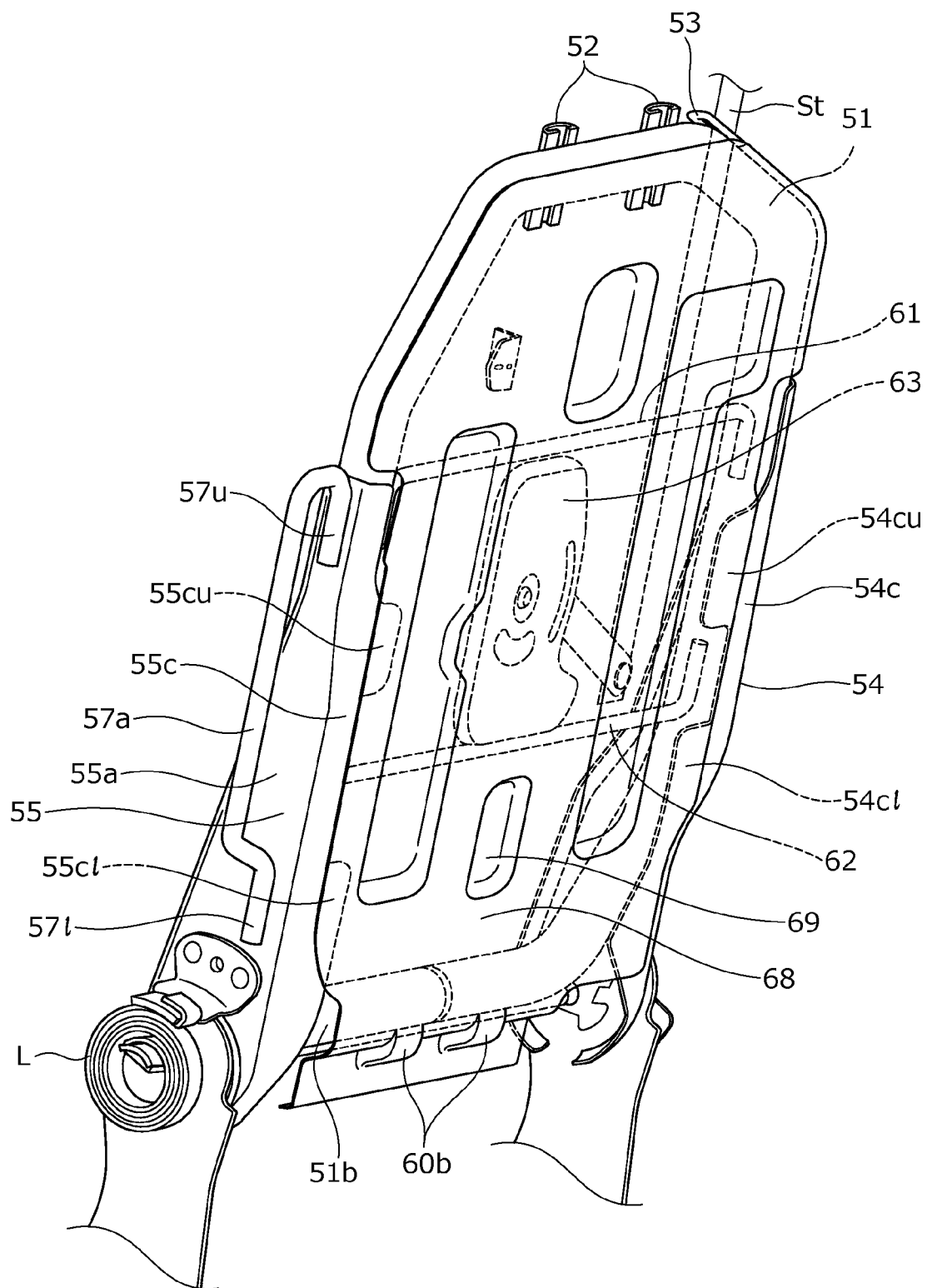
FIG. 15 is an oblique rear perspective view of the seat back frame.
Figure 16:
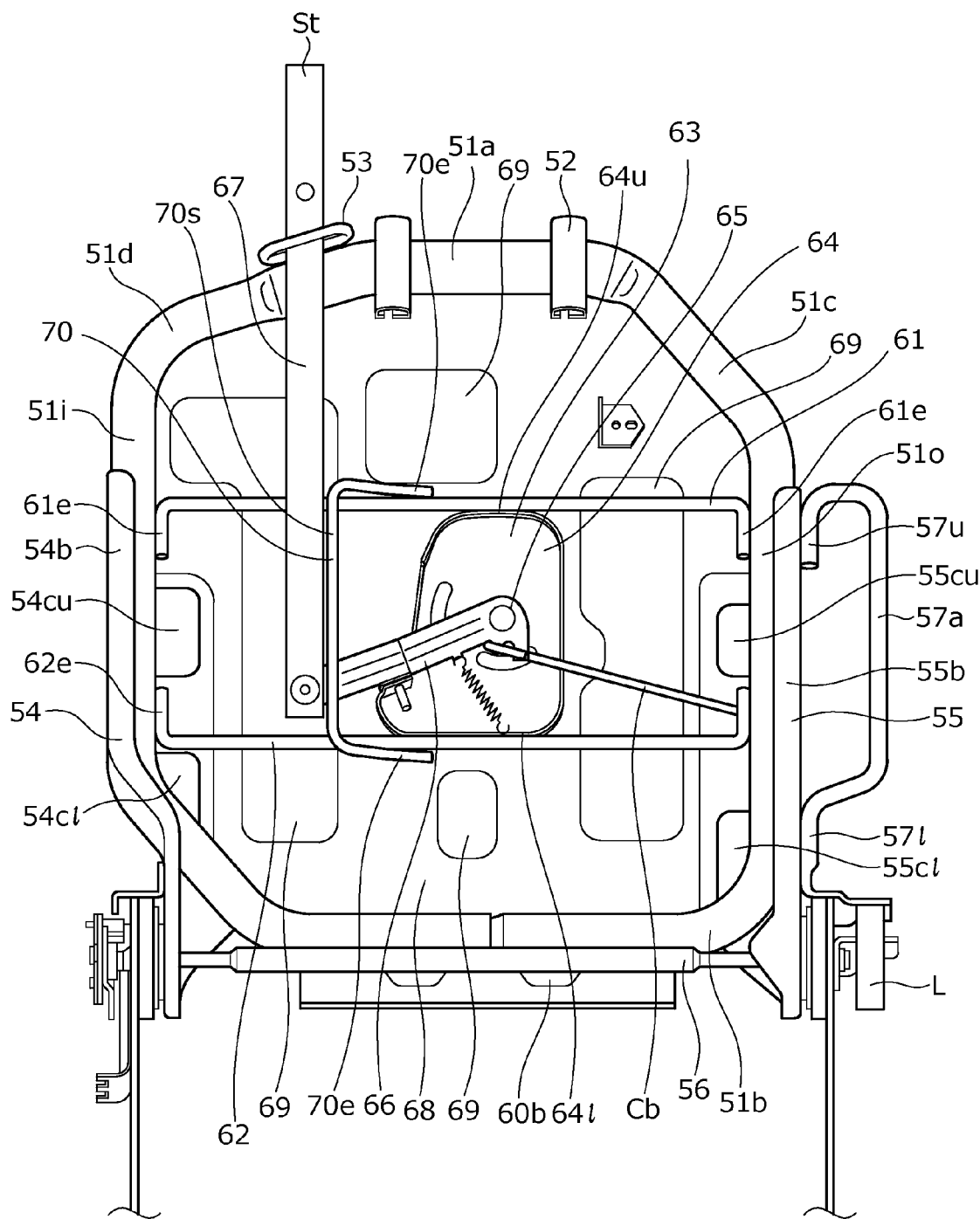
FIG. 16 is a front view of the seat back frame.

The seat back 2 of FIG. 1 is formed by mounting a known cushion pad onto the seat back frame 2a shown in FIGS. 14 to 16 and further covering with a known skin material.

The seat back frame 2a has major constituent elements including a substantially rectangular frame member 51 that forms an outer shape of the seat back 2, side frames 54, 55 extending in the up and down direction along side portions of the frame member 51, and a pan frame 60 expanding over to close a rectangular region formed by the frame member 51.

The frame member 51 is made of a frame shaped body formed into a substantially rectangular shape by bending a metal pipe, including an inner frame portion 51i and an outer frame portion 51o serving as vertical frame portions which extend in the up and down direction respectively on the vehicle inner side and the outer side, and an upper frame portion 51a and a lower frame portion 51b serving as lateral frame portions which connect upper ends and lower ends of the inner frame portion 51i and the outer frame portion 51o.

An end portion of the upper frame portion 51a on the vehicle outer side is bent obliquely downward to form an upper outer side inclined portion 51c extending obliquely with respect to the upper frame portion 51a and the outer frame portion 51o. An end portion of the upper frame portion 51a on the vehicle inner side is bent obliquely downward by an angle smaller than the upper outer side inclined portion 51c to form an upper inner side inclined portion 51d extending obliquely with respect to the upper frame portion 51a and the inner frame portion 51i.

An inner end portion of the lower frame portion 51b is bent obliquely upward to form a lower inner side inclined portion 51e extending obliquely with respect to the lower frame portion 51b and the inner frame portion 51i.

Two longitudinal points of the upper frame portion 51a are squeezed, and a pair of brackets 52 for inserting a pair of headrest pillars 3a is welded and fixed at the squeezed positions. As shown in FIG. 14, the headrest pillars 3a extend to positions where the lower inner side inclined portion 51e is provided in the seat up and down direction.

A flat surface portion 51f formed into a substantially flat surface shape by squeezing a front surface is formed at a position of the upper inner side inclined portion 51d close to the upper frame portion 51a. An oval annular body 53 formed by bending a thin pipe into a substantially oval annular shape is welded and fixed to an upper surface of the flat surface portion 51f.

The inner frame portion 51i and the outer frame portion 51o are respectively arranged on the vehicle inner side and the vehicle outer side of the seat back 2.

The side frames 54, 55 are welded and fixed to end portions of the inner frame portion 51i and the outer frame portion 51o on the seat outer side respectively along the inner frame portion 51i and the outer frame portion 51o. The side frame 54 is placed on the vehicle inner side and the side frame 55 is placed on the vehicle outer side.

The side frames 54, 55 are formed by pressing sheet metal, and respectively include plate shaped side portions 54a, 55a extending in the seat front to back direction, front edge portions 54b, 55b formed by bending front ends of the side portions 54a, 55a toward the seat inner side, and rear edge portions 54c, 55c formed by bending rear ends of the side portions 54a, 55a toward the seat inner side. The side frames are respectively arranged in such a manner that the front edge portions 54b, 55b, the side portions 54a, 55a, and the rear edge portions 54c, 55c wrap seat-outer-side surfaces of the inner frame portion 51i and the outer frame portion 51o.

As shown in FIGS. 14 to 16, the rear edge portions 54c, 55c include substantially rectangular expanding portions 54cu, 54cl, 55cu, 55cl expanding toward the seat inner side respectively on the upper side and on the lower side. The expanding portions 54cu, 54cl, 55cu, 55cl are sandwiched between the inner frame portion 51i, the outer frame portion 51o, and the pan frame 60, and respectively welded and fixed to the inner frame portion 51i, the outer frame portion 51o, and the pan frame 60.

Lower ends of the side frames 54, 55 extend to the lower side of the frame member 51, and shaft holes (not shown) are formed at positions on the lower side of the frame member 51. To the shaft holes (not shown), a pivot shaft 56 that pivots the seat back 2 with respect to the seat cushion 1 at the time of folding the seat back 2 over the seat cushion 1 upon stowing the seat S, and at the time of reclining to change the angle made by the seat back 2 and the seat cushion 1 is attached.

As shown in FIGS. 15 and 16, to the shaft hole (not shown) of the side portion 55a of the side frame 55 on the vehicle outer side, a reclining unit L serving as a reclining device is fixed to expand toward the seat outer side. The reclining unit L is a device for changing the angle made by the seat back 2 and the seat cushion 1.

As shown in FIGS. 14 to 16, to the seat-outer-side surface of the side portion 55a of the side frame 55 on the vehicle outer side, a rigidity improvement member 57 is welded and fixed. The rigidity improvement member 57 is formed by bending a single long metal wire into a substantially C shape. An upper end 57u is welded and fixed to the vicinity of an upper end of the outer side surface of the side portion 55a, and a lower end 57l is fixed to a position close to the lower side of the center of the outer side surface of the side portion 55a. In the rigidity improvement member 57, a projection portion 57a between the upper end 57u and the lower end 57l expands perpendicularly from the side portion 55a toward the outer side in the seat right and left direction as shown in FIG. 15.

The expanding width of the projection portion 57a from the side portion 55a is formed to be slightly smaller than expanding width of the reclining unit L from the side portion 55a. An end portion of the projection portion 57a on the outer side in the seat right and left direction is arranged on the slightly inner side in the seat right and left direction of an end portion of the reclining unit L on the outer side in the seat right and left direction.

The side frame 55 on the seat outer side is sandwiched by the rigidity improvement member 57 and the outer frame portion 51o.

The pan frame 60 is made of a substantially plate shaped metal body, and an outer shape thereof is formed into the substantially same shape as a substantially rectangular shape formed by the frame member 51. The pan frame expands over to close a rear surface of the frame member 51.

An upper part of the pan frame 60, the part on the slightly upper side of upper ends of the side frames 54, 55 is welded and fixed to a part of the frame member 51 ranging from the upper outer side inclined portion 51c to the upper inner side inclined portion 51d through the upper frame portion 51a.

As shown in FIGS. 15 and 16, front surfaces of both right and left end sides of the pan frame 60 are welded and fixed to rear surfaces of the expanding portions 54cu, 54cl, 55cu, 55cl of the rear edge portions 54c, 55c of the side frames 54, 55.

A lower end side of the pan frame 60 is curved from the seat rear side toward the seat front side along a shape of a rear surface of the cylindrical lower frame portion 51b, and the curved part is welded and fixed to the rear surface of the lower frame portion 51b.

The lower end side of the pan frame 60 extends downward again from the front lower end welded and fixed to the lower frame portion 51b, a lower end thereof is curved from the seat rear side toward the seat front side along a shape of a rear surface of the columnar pivot shaft 56, and the curved part is welded and fixed to the rear surface of the pivot shaft 56. In the lower end side of the pan frame 60, the curved part from the seat rear side toward the seat front side corresponds to a bent portion of a turned portion in the embodiments, and the front end of the curved part extending toward the seat front side corresponds to an extending portion of the turned portion in the embodiments.

The lower end of the pan frame 60 is placed on the seat front side of the pivot shaft 56.

In the lower end side of the pan frame 60, beads 60b are formed at two points in a part in the seat width direction of a position continuing to a position where the pan frame is welded and fixed to the lower frame portion 51b.

On a front surface of the pan frame 60, an upper linear member 61 and a lower linear member 62 for reinforcement are welded and fixed to bridge the inner frame portion 51i and the outer frame portion 51b.

The upper linear member 61 and the lower linear member 62 are formed into a substantially U shape by bending both end portions 61e, 62e of columnar and linear metal wires at right angles in the same direction. Both the end portions 61e, 62e are respectively welded and fixed to seat-inner-side surfaces of the inner frame portion 51i and the outer frame portion 51o.

Straight parts between both the end portions are welded and fixed to the front surface of the pan frame 60 at several points.

Both the end portions 61e of the upper linear member 61 are welded and fixed to the inner frame portion 51i and the outer frame portion 51O at positions on the slightly lower side of the upper ends of the side frames 54, 55.

The right and left side frames 54, 55 are also welded and fixed to the inner frame portion 51i and the outer frame portion 51O at positions of the same height as the positions where both the end portions 61e are welded and fixed.

Therefore, to the seat-outer-side surfaces of the inner frame portion 51i and the outer frame portion 51O at the positions where the end portions 61 e of the upper linear member 61 are welded and fixed to the seat-inner-side surfaces thereof, the side frames 54, 55 are welded and fixed.

Further, to the seat-outer-side surface of the side frame 55 at the position where the inner frame portion 51i is welded and fixed to an inner surface thereof, the upper end 57u of the rigidity improvement member 57 is welded and fixed.

In such a way, both the end portions 61e of the upper linear member 61, the side frames 54, 55, and the upper end 57u of the rigidity improvement member 57 are welded and fixed at the same positions in the longitudinal direction, and the welding and fixing positions are arranged on the seat-inner and -outer surfaces of the same member. Thus, rigidity can be improved.

Both the end portions 61e of the upper linear member 61 are welded to the outer frame portion 51O and the inner frame portion 51i at positions where the expanding portions 54cu, 54c1, 55cu, 55cl of the rear edge portions 54c, 55c of the side frames 54, 55 are not formed. Both the end portions 62e of the lower linear member 62 are welded to the outer frame portion 51O and the inner frame portion 51i between the upper and lower expanding portions 54cu and 54c1, and 55cu and 55cl of the rear edge portions 54c, 55c of the side frames 54, 55. Therefore, contact between the rear edge portions 54c, 55c of the side frames 54, 55 and the upper linear member 61 and the lower linear member 62 is suppressed.

At a position sandwiched between the longitudinal centers of the upper linear member 61 and the lower linear member 62, a movable unit 63 serving as a transmission device for transmitting an operation of the operation strap St by the passenger to the seat stowing mechanism 4 is provided on the front surface of the pan frame 60.

As shown in FIG. 16, the movable unit 63 includes a reinforcing plate 64 fixed to the front surface of the pan frame 60, a pivot shaft 65 inserted into shaft holes which are provided in the reinforcing plate 64 and the pan frame 60, a long plate shaped first arm 66 pivotable about the pivot shaft 65, a long second arm 67 coupled to an end portion of the first arm 66 on the opposite side to the pivot shaft 65 pivotably with respect to the first arm 66, the operation strap St attached to an end portion of the second arm 67 on the opposite side to the first arm, and a cable Cb fixed to an outer surface of the first arm 66 in the vicinity of the pivot shaft 65.

The second arm 67 passes through the oval annular body 53 fixed to the upper frame portion 51a as shown in FIG. 16, and arranged in such a manner that the operation strap St projects to an upper end of the seat back 2 as shown in FIG. 1.

In the movable unit 63, when the operation strap St is pulled upward by the passenger, the second arm 67 is moved upward, the first arm 66 is rotated clockwise in a front view of FIG. 16, and the cable Cb fixed around the pivot shaft 65 of the first arm 66 is pulled. Thereby, the seat stowing mechanism 4 is operated.

The reinforcing plate 64 is formed into a substantially trapezoidal shape in which an upper side 64u and a lower side 64l extend in the seat width direction. The upper side 64u is abutted with a lower end of the upper linear member 61, and the lower side 64l is abutted with an upper end of the lower linear member 62.

The movable unit 63 is provided in a flat surface portion 68 of the pan frame 60 where no beads are provided. In the pan frame 60, a plurality of beads 69 serving as bead portions projecting toward the seat front side of the flat surface portion 68 is provided around the reinforcing plate 64.

As shown in FIG. 14, the upper linear member 61 and the lower linear member 62 perpendicularly cross the headrest pillars 3a. The movable unit 63 is arranged at a position sandwiched by the pair of headrest pillars 3a in the seat width direction.

A guide linear member 70 is fixed to the pan frame 60 to bridge the upper linear member 61 and the lower linear member 62.

The guide linear member 70 is formed into a substantially C shape by bending both end portions 70e of a columnar and linear metal wire at right angles in the same direction. The upper end portion 70e of the guide linear member 70 is welded and fixed to the front surface of the pan frame 60 in such a manner that a lower surface thereof is abutted with an upper surface of the upper linear member 61. The lower end portion 70e is welded and fixed to the front surface of the pan frame 60 in such a manner that an upper surface thereof is abutted with a lower surface of the lower linear member 62.

The end portions 70e of the guide linear member 70 and the upper linear member 61 and the lower linear member 62 may be respectively fixed to each other by welding, an adhesive, or the like. With such a configuration, attachment rigidity of the guide linear member 70 is furthermore improved.

An upper end side and a lower end side of a straight portion 70s between both the end portions 70e of the guide linear member 70 are abutted with surfaces of the upper linear member 61 and the lower linear member 62 on the opposite side to the pan frame 60. The straight portion is arranged to have a gap corresponding to thickness of the upper linear member 61 and the lower linear member 62. That is, the upper linear member 61 and the lower linear member 62 are sandwiched by the pan frame 60 and the straight portion 70s of the guide linear member 70.

The straight portion 70s is arranged at the substantially same position in the seat width direction as an end portion of the oval annular body 53 on the seat inner side to extend in the up and down direction, and plays a role of a slide guide along which the second arm 67 slides when the second arm 67 is attached.

The first arm 66 is inserted into a gap between the pan frame 60 and the straight portion 70s.

Figure 17:
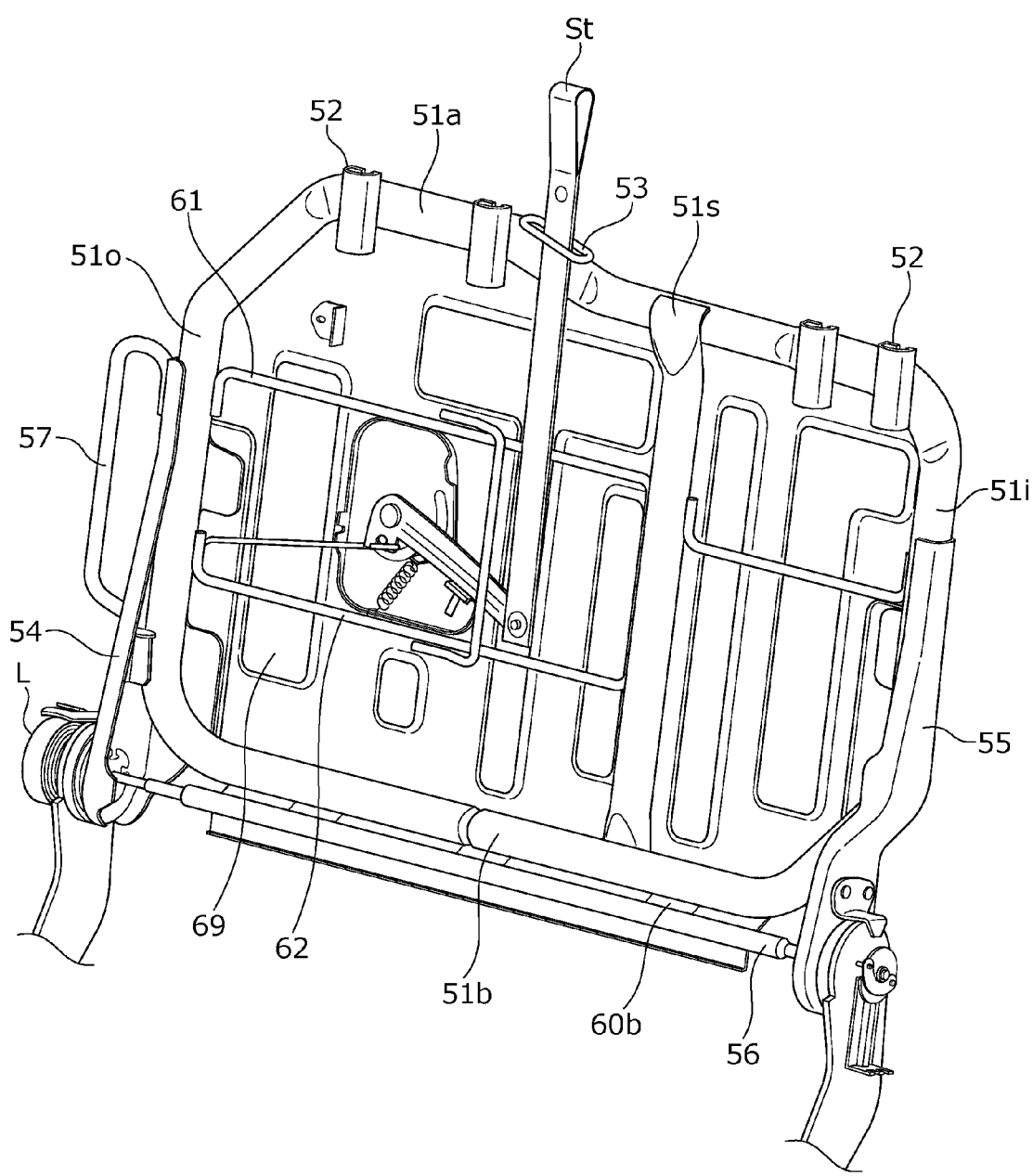
FIG. 17 is an oblique front perspective view of the seat back frame.

FIG. 17 is a view showing a seat back frame 2a provided in the seat S having longer lateral width among the two seats S forming the rear seat and having different lateral width from each other.

In the seat back frame 2a provided in the seat S having longer lateral width, an auxiliary frame member 51s that bridges the upper frame portion 51a and the lower frame portion 51b is provided. A region sandwiched by the auxiliary frame member 51s and the outer frame portion 51o has the same configuration as the configuration of the seat back frame 2a of the seat S having shorter lateral width of FIGS. 14 to 16.

Configuration of Seat Stowing Mechanism

Next, a configuration of the seat stowing mechanism 4 described above will be described in detail with reference to FIGS. 9 to 10, 18 to 19.

Figure 9:
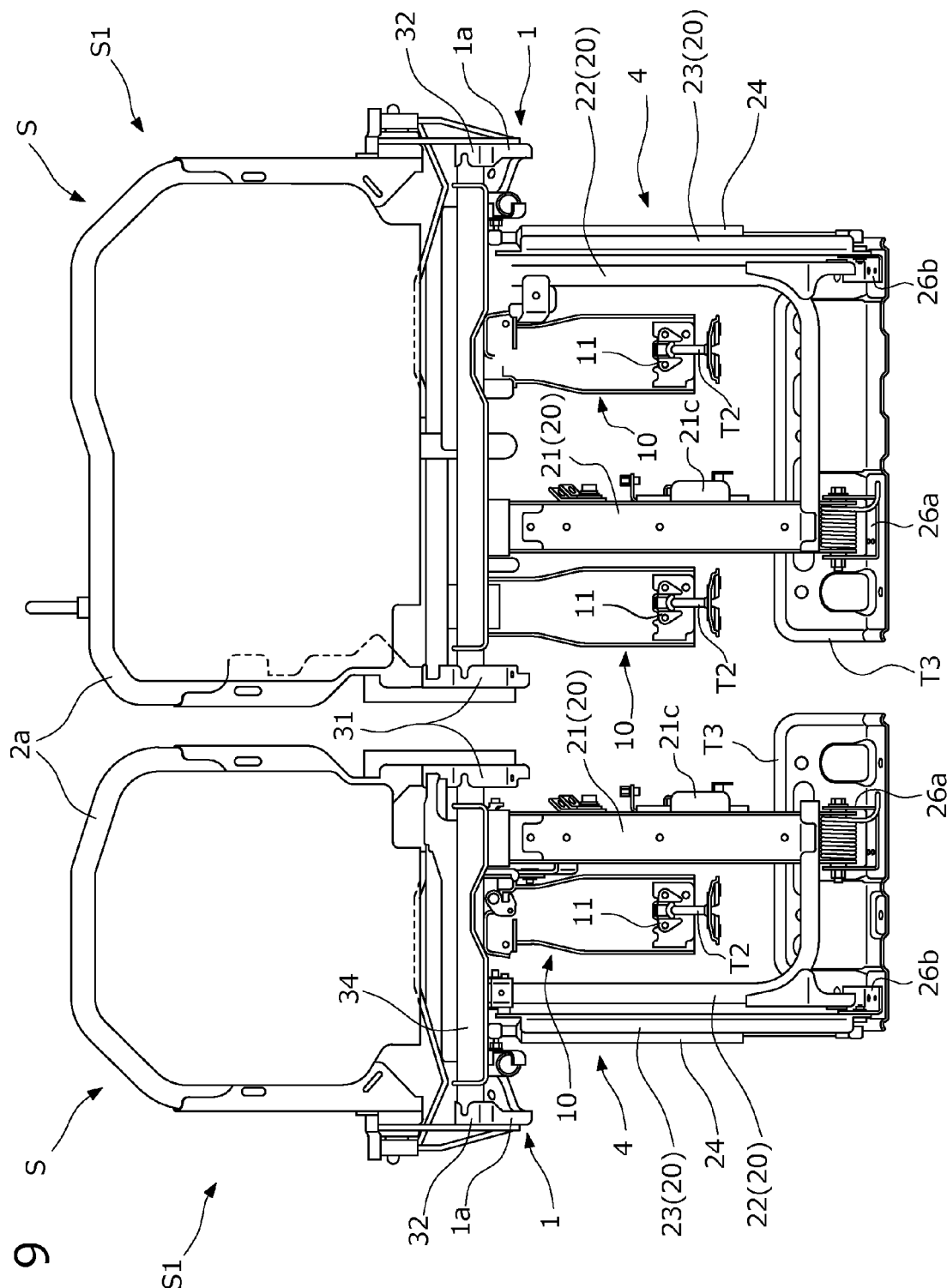
FIG. 9 is a rear view in which an internal mechanism of the vehicle seat.

As shown in FIG. 9, the seat stowing mechanism 4 is separately provided for each of the two seats S forming the rear seat and having different lateral width from each other. There is a slight difference such as a difference in the number of the foot link 10 between the seat stowing mechanism 4 provided in the seat S having shorter lateral width and the seat stowing mechanism 4 provided in the seat S having longer lateral width. However, both the mechanisms share the same basic configuration. Therefore, hereinafter, only the configuration of the seat stowing mechanism 4 of the seat S having shorter lateral width will be described.

As shown in FIGS. 9 to 10, 18 to 19, the seat stowing mechanism 4 includes the foot link 10 and three pivot links 20. More Specifically, the seat stowing mechanism 4 includes an inner link 21, an outer link 22, and a guide link 23 as the three pivot links 20. As shown in FIGS. 9 and 10, the seat stowing mechanism 4 includes the piston damper 24 as a bias member.

Figure 19:
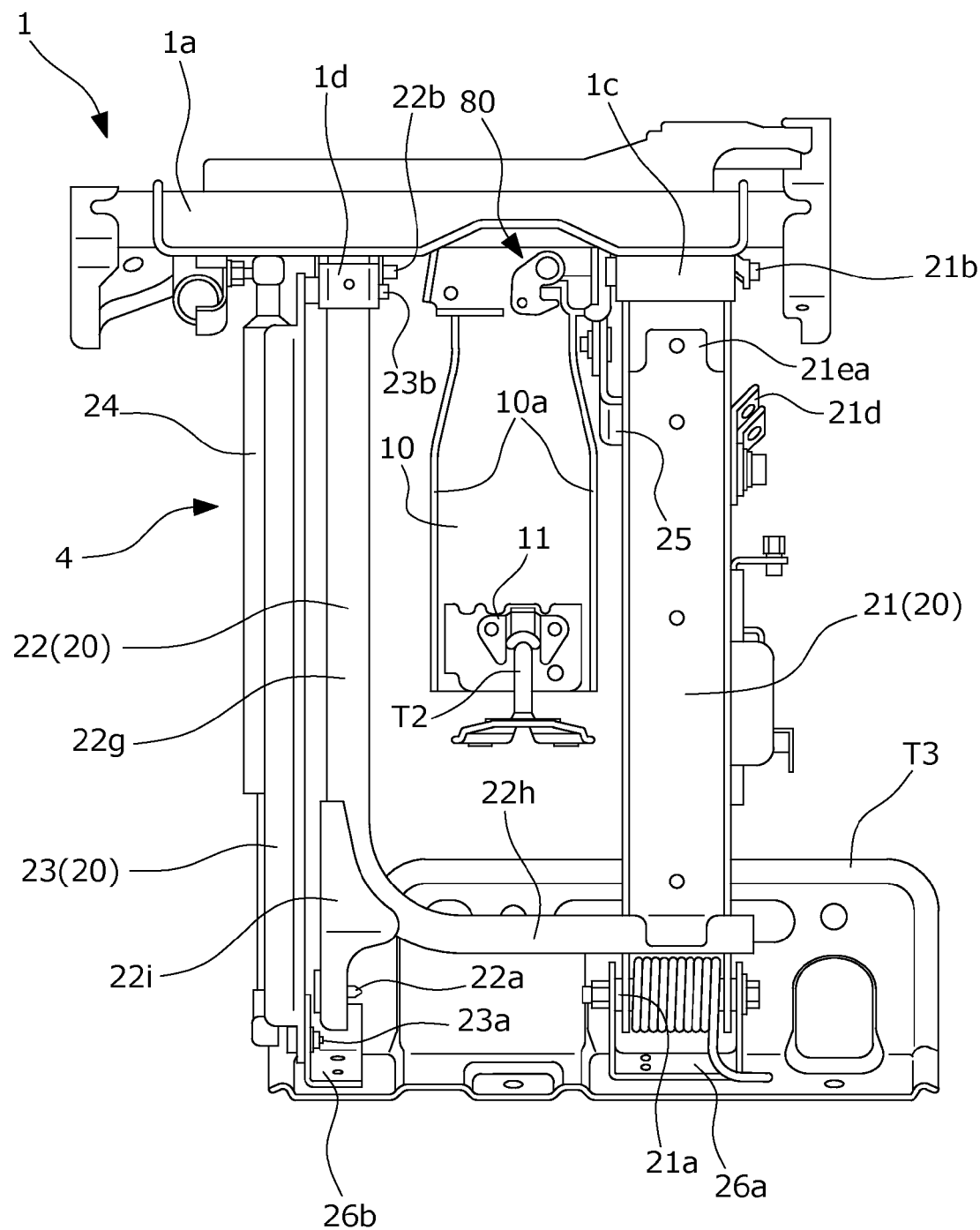
FIG. 19 is a rear view of the seat stowing mechanism.

The foot link 10 is made of a plate shaped steel material, and flange portions 10a are formed by bending both ends thereof to ensure the rigidity. As shown in FIG. 19, the foot link 10 includes the first lock mechanism 11 in a lower end portion, and is engaged with the striker T2 attached to the vehicle body floor T. The foot link 10 is coupled to the side of the seat cushion frame 1a in a pivotable state. A detail of the first lock mechanism 11 will be described later.

Figure 18:
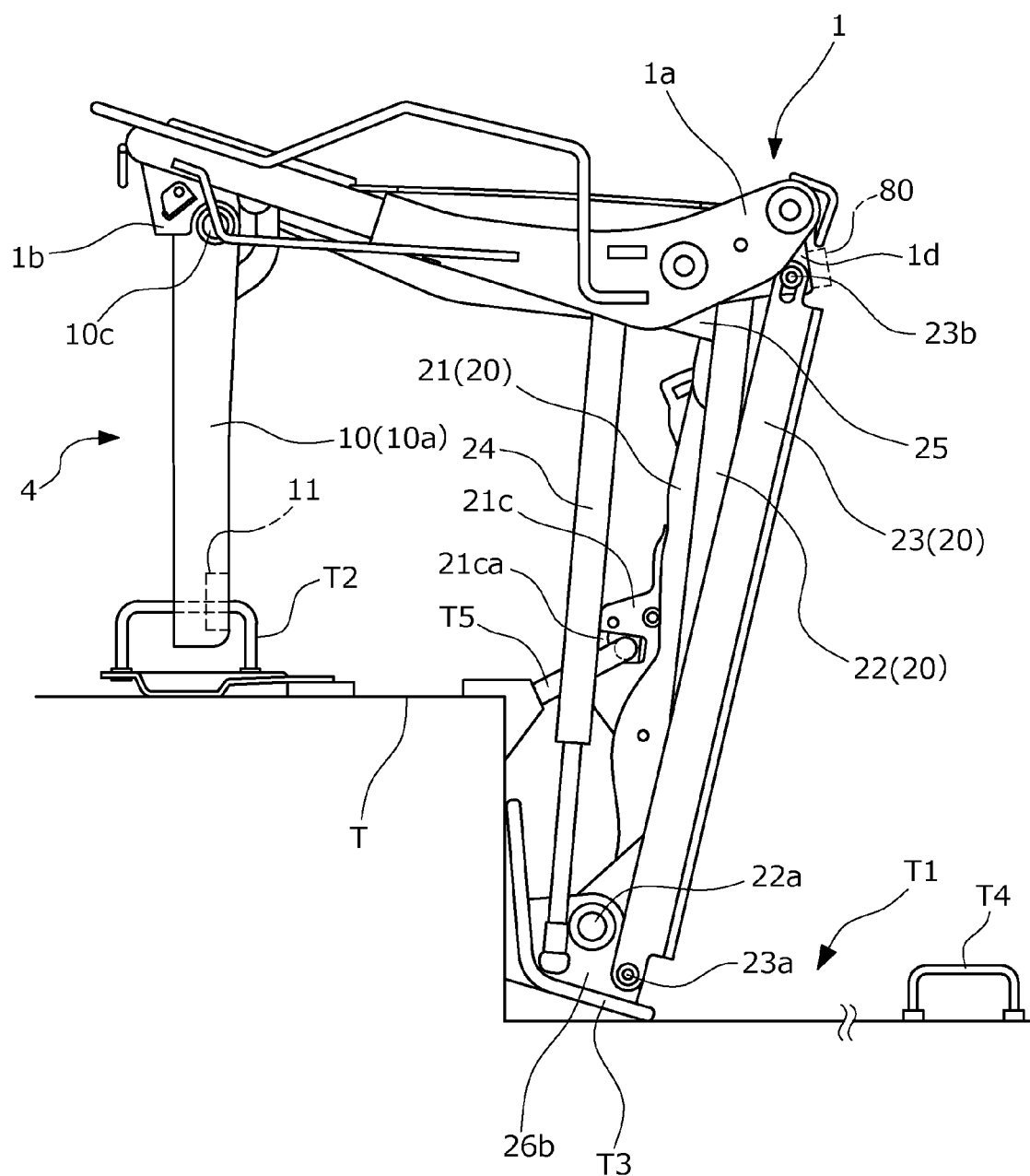
FIG. 18 is a side view of the seat stowing mechanism.

More Specifically, as shown in FIG. 18, the fixing bracket 35 for fixing a foot link pivot shaft 10c is attached to the front end portion of the seat cushion 1 (strictly speaking, the seat cushion frame 1a) by welding. The upper end portion of the foot link 10 is supported on the foot link pivot shaft 10c fixed to this fixing bracket 35. Thereby, the foot link 10 can come and go between a standing position (position of the foot link 10 shown in FIG. 6) and a folded position (position of the foot link 10 shown in FIG. 8).

A coil spring (not shown) is installed in the foot link pivot shaft 10c. One end of the coil spring is fastened to a rear surface of the foot link 10, and the other end of the coil spring is fastened to the seat cushion frame 1a. Thereby, the foot link 10 is biased toward the standing position by the coil spring.

One end portion of the intermediary member 25 described above is attached to the foot link 10, so that drive force is transmitted from the pivot link 20 (more specifically, the inner link 21 or the outer link 22). Specifically, when the pivot link 20 is pivoted in the direction in which the pivot link is inclined rearward, by utilizing the pivot action, the intermediary member 25 presses forward the upper end portion of the foot link 10, strictly speaking, the part placed on the upper side of the food link pivot shaft 10c. Thereby, the foot link 10 is pivoted to be folded against bias force of the above coil spring.

As shown in FIG. 9, one foot link 10 is attached in a substantially center part in the width direction of the seat S having smaller lateral width, whereas one foot link is attached to the outer side in the width direction and one foot link is attached to the inner side, that is, the two foot links 10 in total are attached in the seat S having larger size in the width direction.

The inner link 21 corresponds to a first link, supports the seated portion S1 when the seat S is in a use state, and moves the seated portion S1 into the stowing space T1 at the time of stowing the seat S.

The outer link 22 corresponds to a second link, and moves the seated portion S1 into the stowing space T1 together with the inner link 21 at the time of stowing the seat S.

The inner link 21 is placed on the inner side in the width direction, and the outer link 22 is placed on the outer side in the width direction. The outer side in the width direction indicates the side close to a side wall of the vehicle in which the seat S is installed (strictly speaking, the closer side wall when seen from the seat S), and the inner side in the width direction indicates the side separated from the side wall of the vehicle, more specifically, the side close to the adjacent seat S.

The guide link 23 corresponds to a third link, and guides the seat cushion 1 in such a manner that the seat cushion 1 is moved to the stowing space T1 along a predetermined trajectory at the time of stowing the seat S.

The inner link 21, the outer link 22, and the guide link 23 are all coupled to a rear end portion of the seat cushion 1 (strictly speaking, the seat cushion frame 1a), and supported pivotably with respect to the vehicle body floor T.

More Specifically, an attaching bracket T3 is attached to the vehicle body floor T (strictly speaking, a front wall surface of the stowing space T1). Shaft fixing tools 26a, 26b shown in FIGS. 10, 18 to 19 are attached onto the attachment bracket T3 by welding.

An inner link pivot shaft 21a is fixed to the shaft fixing tool 26a on one side, and a lower end portion of the inner link 21 is supported on the inner link pivot shaft 21a. An outer link pivot shaft 22a and a guide link pivot shaft 23a are fixed to the shaft fixing tool 26b on the other side, a lower end portion of the outer link 22 is supported on the outer link pivot shaft 22a, and a lower end portion of the guide link 23 is supported on the guide link pivot shaft 23a.

As described above, the inner link 21, the outer link 22, and the guide link 23 are pivoted about the corresponding pivot shafts 21a, 22a, 23a to be inclined forward or rearward.

A positional relationship between the inner link pivot shaft 21a and the outer link pivot shaft 22a is designed in such a manner that axial centers of the pivot shafts 21a, 22a match with each other in the front to back direction and in the up and down direction. A positional relationship between the outer link pivot shaft 22a and the guide link pivot shaft 23a is designed in such a manner that the axial center of the outer link pivot shaft 22a is placed on the front side and on the upper side of an axial center of the guide link pivot shaft 23a as shown in FIG. 18.

The inner link 21, the outer link 22, and the guide link 23 are coupled to the seat cushion 1 in a state where the links are pivotable with respect to the seat cushion 1. More Specifically, as shown in FIGS. 10, 18 to 19, fixing brackets 1c, 1d for fixing coupling shafts 21b, 22b, 23b are attached to the rear end portion of the seat cushion 1 (strictly speaking, the seat cushion frame 1a).

The coupling shaft 21b that pivotably supports an upper end portion of the inner link 21 is fixed to the fixing bracket 1c on one side. The coupling shaft 22b that pivotably supports an upper end portion of the outer link 22 and the coupling shaft 23b that pivotably supports an upper end portion of the guide link 23 are fixed to the fixing bracket 1d on the other side.

As described above, since the upper end portions thereof are supported on the coupling shafts 21b, 22b, 23b, the inner link 21, the outer link 22, and the guide link 23 can be relatively pivoted with respect to the seat cushion 1. In other words, the seat cushion 1 is relatively pivotable with respect to the inner link 21, the outer link 22, and the guide link 23.

Configuration of Each Of Pivot Links

Next, configurations of the inner link 21, the outer link 22, and the guide link 23 will be described.

Figure 20:
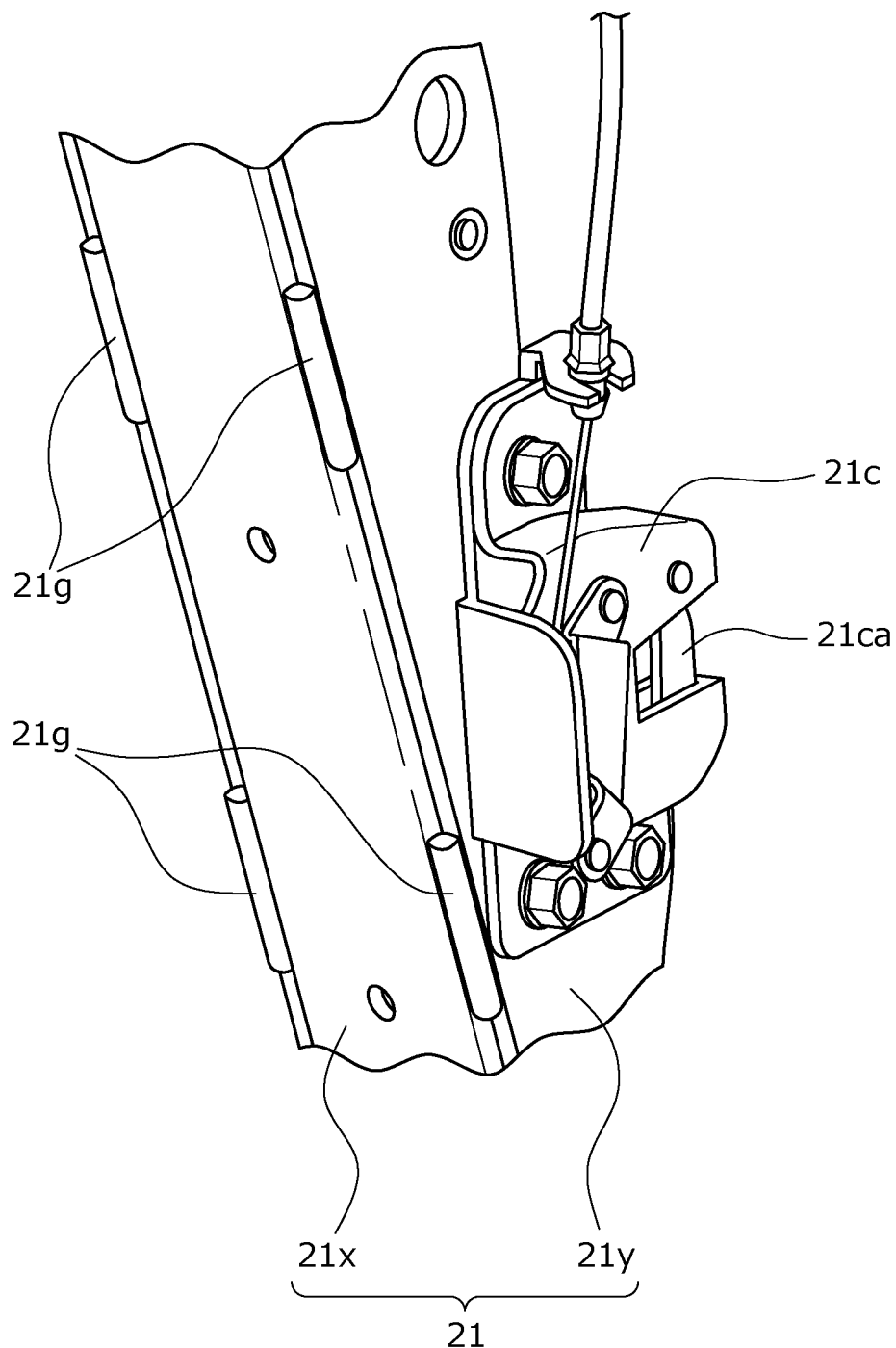
FIG. 20 is a perspective view showing a periphery of a third lock mechanism provided in an inner link.

The inner link 21 is made of a substantially square-tubular steel material, more in detail, formed into a tubular shape by combining a steel plate 21x bent into a substantially U shape and a steel plate 21y (which is slightly larger than the steel plate 21x) and bonding the plates with welding portions 21g at predetermined intervals in the extending direction as shown in FIG. 20. That is, a section (section crossing the extending direction) of the inner link 21 is a closed section. Tongue shaped projections 21ea are formed in both end portions in the extending direction of the steel plate 21x of the inner link 21. The inner link pivot shaft 21a is attached to the tongue shaped projection 21ea on one side (on the lower side), and the coupling shaft 21b is attached to the tongue shaped projection 21ea on the other side (on the upper side).

In a side wall portion of the steel plate 21y of the inner link 21 on the inner side in the width direction of the vehicle seat, the third lock mechanism 21c shown in FIGS. 10, 18, and 20 is attached to face the front side. This third lock mechanism 21c is to lock the seated portion S1 placed at the seating position as well as the first lock mechanism 11 provided in the foot link 10.

Specifically, as shown in FIG. 20, the third lock mechanism 21c is fixed to an inner surface of the steel plate 21y between the welding portions 21g in the up and down direction. In order to lock the seated portion S1 at the seating position, the third lock mechanism 21c is engaged with a striker (not shown) attached to the front wall surface of the stowing space T1 of the vehicle body floor T.

An engagement state between the third lock mechanism 21c and the striker is canceled at timing when the engagement state between the first lock mechanism 11 provided in the foot link 10 and the striker T2 is canceled. As described above, since the third lock mechanism 21c is attached to a front side wall of the inner link 21, rigidity of the inner link 21 is accordingly enhanced.

The first lock mechanism 11 of the foot link 10 is provided to face the lower side and engaged with the striker T2, whereas the third lock mechanism 21c of the inner link 21 is provided to face the front side and engaged with the striker (not shown). In such a way, the lock mechanism of the foot link 10 is provided in the different direction from the lock mechanism of the inner link 21. Therefore, in a case where a shock is added to the vehicle in one direction, force in the lock cancelling direction is not applied to one of the first lock mechanism 11 and the third lock mechanism 21c. Thus, the lock can be easily maintained and a posture of the seat S can be stably kept.

Further, as shown in FIG. 19, a seatbelt anchor 21d is attached to the inner side wall portion of the steel plate 21y of the inner link 21 to which the third lock mechanism 21c is attached on the upper side of the third lock mechanism 21c. This seatbelt anchor 21d is to fix a fixing buckle (not shown) of a seatbelt, and includes two metal plates having insertion holes. The fixing buckle is fixed to the seatbelt anchor 21d by a bolt passing through the holes formed in the two metal plates.

As described above, since the seatbelt anchor 21d is attached to the front side wall of the highly rigid inner link 21, the seatbelt anchor 21d is stably fixed and arrangement is not displaced even after long time of use.

The outer link 22 is formed by bending a cylindrical metal pipe into a substantially L shape, and a long part 22g is provided along the inner link 21. A short part 22h of the L shaped outer link 22 extends toward the inner link 21. The lower short part 22h is bonded to one end portion (lower end portion) in the extending direction of the inner link 21 by welding. In such a way, between the inner link 21 and the outer link 22, a coupling portion that couples both the links 21, 22 is provided. The coupling portion is formed by one part of the outer link 22, more specifically, the lower short part 22h of the outer link 22.

The one end portion of the inner link 21 forms a housing portion 21e that covers the front side, the rear side, and the upper side of the lower short part 22h and houses the lower short part 22h. Specifically, the tongue shaped projection 21e of the inner link 21 is arranged along an outer surface of the lower short part 22h of the outer link 22, and the housing portion 21e is formed by the tongue shaped projection 21ea of the steel plate 21x and a lower end portion 21eb, and substantially semi-circular cut-away portions 21ec formed to penetrate both side surfaces of the steel plate 21y. In this housing portion 21e, the tongue shaped projection 21ea of the steel plate 21x covers the rear side of the lower short part 22h, the lower end portion 21eb covers the upper side of the lower short part 22h, and the steel plate 21y where the cut-away portions 21ec are formed covers the front side of the lower short part 22h so that the lower short part 22h is housed.

Figure 21A:
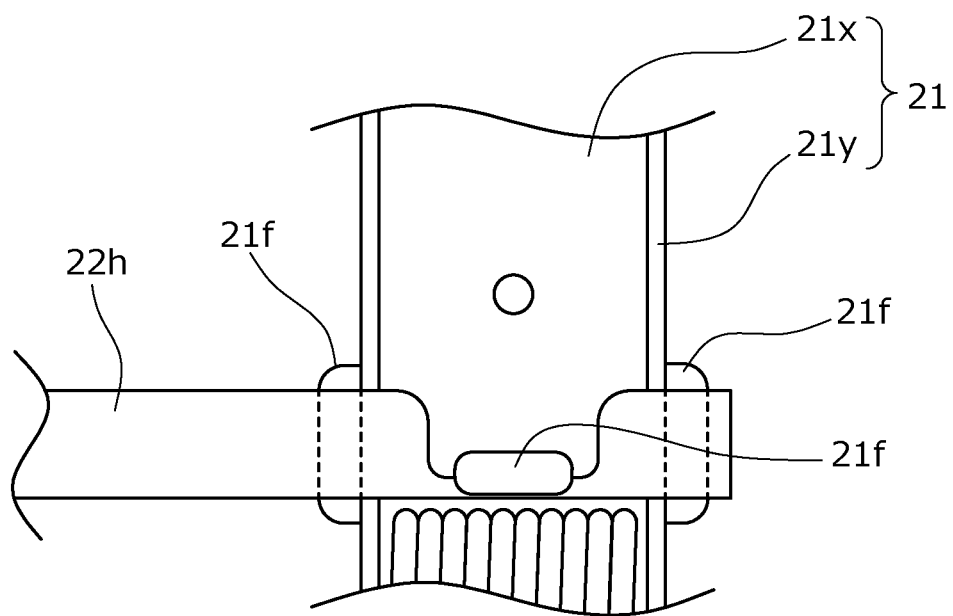
FIG. 21A is a rear view showing a welding portion of the inner link and an outer link.
Figure 21B:
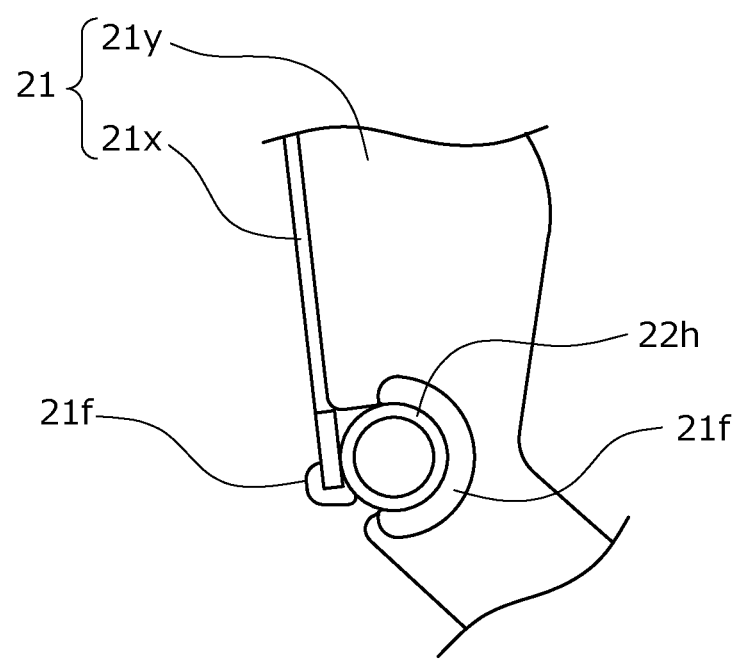
FIG. 21B is a side view showing the welding portion of the inner link and the outer link.

As shown in FIGS. 21A and 21B, edges of the cut-away portions 21ec at two points of both the side surfaces of the steel plate 21y in the lower end portion of the inner link 21 and one point of a lower edge of the tongue shaped projection 21ea are bonded to the lower short part 22h by wending portions 21f. More specifically, the welding portion 21f of the lower edge of the tongue shaped projection 21ea is placed between the welding portions 21f at the two points of both the side surfaces of the steel plate 21y in the width direction of the seat S. In such a way, the links are welded at the above positions in a state where the inner link 21 houses the lower short part 22h. Thereby, the inner link 21 and the outer link 22 are compactly and firmly coupled.

As described above, the inner link 21 is formed to have a closed section. Thus, while ensuring the rigidity, resources can be saved and cost can be reduced.

The links are coupled by the welding portions 21f in a state where the inner link 21 houses the lower short part 22h of the outer link 22. Thereby, the links are compactly coupled with high bonding force, so that rigidity of both the links is improved. Further, the lower short part 22h of the outer link 22 is used as the coupling portion (first coupling portion) to the inner link 21. Thus, without increasing the number of parts, the inner link 21 and the outer link 22 can be coupled to each other.

As described above, the inner link 21 is formed to have a closed section. Thus, while ensuring the rigidity, resources can be saved and cost can be reduced.

The links are coupled by the welding portions 21f in a state where the inner link 21 houses the lower short part 22h of the outer link 22. Thereby, the links are compactly coupled with high bonding force, so that the rigidity of both the links is improved. Further, the lower short part 22h of the outer link 22 is used as the coupling portion (first coupling portion) to the inner link 21. Thus, without increasing the number of parts, the inner link 21 and the outer link 22 can be coupled to each other.

As shown in FIG. 19, the outer link 22 includes an extending bracket 22i welded to a bent part thereof This extending bracket 22i extends downward, and the outer link pivot shaft 22a is attached to a front end portion (lower end portion) thereof.

The guide link 23 is made of an angle type steel plate, and provided along the inner link 21 and the long part 22g of the outer link 22. This guide link 23 has lower rigidity than that of the inner link 21 and the outer link 22, and does not have sufficient strength to support and carry the seated portion S1. Therefore, as described above, the guide link 23 only has a function of guiding and bringing the seated portion S1 toward the stowing space T1 in a correct trajectory at the time of stowing the seat S.

Figure 22:
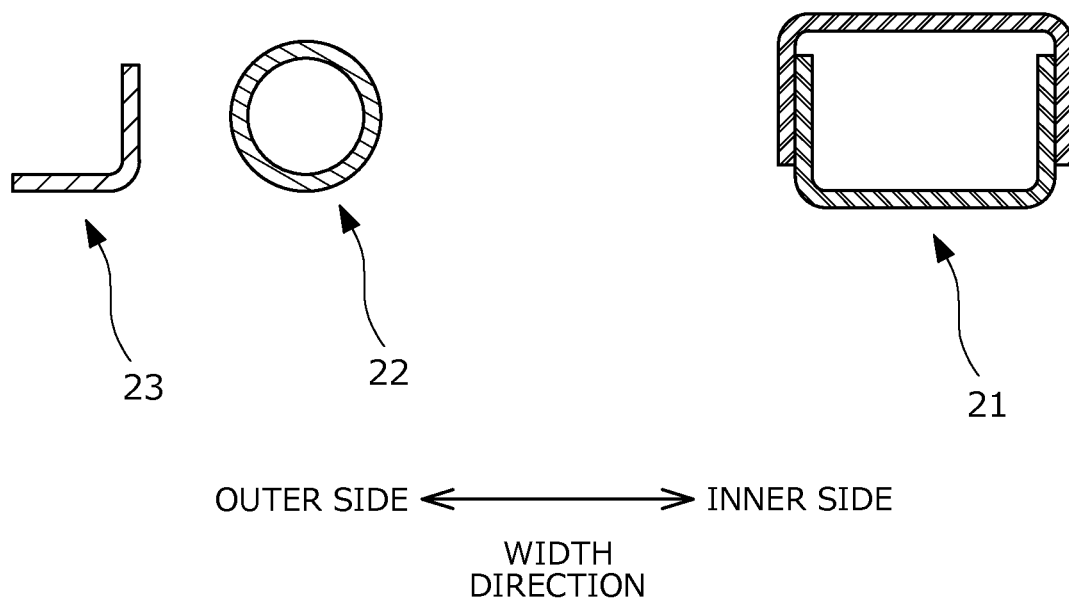
FIG. 22 is a schematic cross-sectional view of pivot links.

In the present embodiment, size (thickness) of the inner link 21 is greater than size (thickness) of the outer link 22 and the guide link 23. In more detail, as shown in FIG. 20, the inner link 21 has a hollow square section, the outer link 22 has a hollow circular section, and the guide link 23 has a substantially L shaped section. The sections of the pivot links 20 indicate sections of main bodies (different from the end portions supported on the pivot shafts) of the pivot links 20. In the present embodiment, as shown in FIG. 22, length in the front to back direction, length in the width direction, and second moment of area of the inner link 21 are all greater than those of the outer link 22 and the guide link 23.

Configuration of Piston Damper

The piston damper 24 is a bias member that applies bias force toward the outer side in the extending direction thereof. In the present embodiment, as shown in FIG. 2, the piston damper biases upward the seat cushion 1 of the seated portion S1 when the seat S is in a use state. With this piston damper 24 being provided, even when a load of a seating person is applied, the seat cushion 1 can be favorably retained at a predetermined position. In order to exhibit such a performance, an upper end portion of the piston damper 24 is fixed to a side wall of the seat cushion frame 1a as shown in FIG. 18.

At the time of stowing the seat S, the piston damper 24 is pivoted in the same direction as the pivoting direction of the pivot links 20 (that is, the inner link 21, the outer link 22, and the guide link 23), and inclined rearward together with the pivot links 20. That is, the piston damper 24 is pivoted with respect to the vehicle body floor T together with the pivot links 20 while biasing the seat cushion 1. Therefore, a lower end portion of the piston damper 24 is supported on a pivot shaft (not shown). The pivot shaft is fixed to the shaft fixing tool 26b to which the outer link pivot shaft 22a and the guide link pivot shaft 23a are fixed.

A bias spring (not shown) is attached to the pivot shaft. The piston damper 24 is always biased to the side of the stowed position about the pivot shaft by the bias spring as well as the pivot links 20.

Further, in a state shown in FIG. 5 where the seat S is completely stowed in the stowing space T1, the piston damper 24 is in a posture slightly more inclined than a horizontal posture. In more detail, the piston damper is in a posture in which the end portion fixed to the side wall of the seat cushion frame 1a is placed on the lower side of the pivot shaft. The piston damper 24 in such a posture biases the seat cushion frame 1a downward. Thereby, in a state where the seat S is completely stowed in the stowing space T1, the seat cushion 1 is biased downward by the piston damper 24. Thus, a stowed state can be favorably maintained.

When the seat S is raised from the state where the seat is stowed in the stowing space T1 and returned to a use state and when the bias force by the piston damper 24 works upward, there is a fear that the seat S suddenly springs up and collides with the operator (passenger). In the present embodiment, when the seat S is in a stowed state, the bias force of the piston damper 24 works downward as described above. Thus, collision between the seat S and the passenger can be suppressed.

As shown in FIG. 19, the piston damper 24 is arranged at a position to face at least one part of the guide link 23 in the right and left direction. At a use position, as shown in FIG. 3, the piston damper is arranged on the front side of the pivot links 20, and can be supported at a position rather close to a center part in the front to back direction of the seat cushion 1.

The piston damper 24 and the guide link 23 are coupled to the vehicle body floor by utilizing the attachment bracket T3 that couples the outer link 22 and the vehicle body floor.

As shown in FIG. 2, at the use position, the piston damper 24 is arranged and inclined rearward with respect to the vehicle body floor by the same inclination angle as that of the inner link 21 and the outer link 22 in the front to back direction.

Arrangement of Pivot Links and Piston Damper

As already described above, in a case where the plurality of pivot links 20 is provided as a mechanism for moving the seated portion Si including the seat cushion 1 to the stowed position, arrangement positions of these pivot links 20 are required to be positions where the pivot links are not brought into contact with each other and where the seat S can be stowed more compactly in a stowed state.

Regarding the arrangement positions of the pivot links 20, the pivot links 20 are required to be arranged in a well-balanced manner so that support rigidity by the pivot links 20 is equalized between one end side and the other end side in the width direction of the seat S.

Regarding arrangement of the pivot links 20, the arrangement positions are required to be positions where contact between the pivot links 20 or contact between the pivot links 20 and other members can be suppressed while ensuring freedom.

Thus, in the present embodiment, the arrangement positions of the three pivot links 20 described above are designed to meet the above requirements.

Specifically, the arrangement of the pivot links 20 according to the present embodiment is asymmetric when seen from the center in the width direction of the seat S as shown in FIGS. 9 and 19. More specifically, the three pivot links 20 are arranged at different positions from each other in the width direction. From the outer side in the width direction toward the inner side, the guide link 23, the outer link 22, and the inner link 21 are arranged in this order. As described above, the pivot links 20 are arranged at the different positions from each other in the width direction. Thus, the contact between the pivot links 20 can be suppressed.

Particularly in the present embodiment, the pivot link 20 having the greatest size (thickness) (that is, the inner link 21) is arranged on the inner side in the width direction, and the other pivot links 20 (that is, the outer link 22 and the guide link 23) are arranged on the outer side in the width direction. In other words, the guide link 23 is arranged at a position rather close to the outer link 22 among the inner link 21 and the outer link 22 in the width direction. Thereby, the pivot links 20 can be suppressed from being arranged only on one of the outer side and the inner side in the width direction. Put more simply, in the present embodiment, the guide link 23 is arranged to be rather close to the outer link 22 among the inner link 21 having the greater size and the outer link 22 having the smaller size. Thereby, the three pivot links 20 are arranged in a well-balanced manner As a result, the support rigidity by the pivot links 20 is equalized in the width direction of the seat S.

The two seats S are installed side by side in the width direction in the present embodiment. Thus, an installment space of the pivot links 20 is restricted on the inner side in the width direction of the seat S in comparison to the outer side in the width direction. Therefore, there is a need for reducing the installing number of the pivot links 20 arranged on the inner side in the width direction of the seat S and accordingly enhancing the rigidity of the pivot links 20. Based on this, in the present embodiment, the two pivot links 20 (that is, the outer link 22 and the guide link 23) are arranged on the outer side in the width direction of the seat S, whereas only one pivot link 20 (that is, the inner link 21) having the greatest size is arranged on the inner side in the width direction of the seat S.

In the present embodiment, as shown in FIGS. 9 and 19, the arrangement position of the inner link 21 is a position closer to the center of the seat S in the width direction than the arrangement position of the outer link 22. Thereby, problems pivoting of the inner link 21 can be avoided. In more detail, the size of the inner link 21 is the greatest among the three pivot links 20. When such an inner link 21 is arranged on the end side of the seat S, there is a possibility that a device beside the seat S (specifically, the adjacent seat S) and the inner link 21 are brought into contact with each other. Therefore, by placing the inner link 21 close to the center of the seat S in the width direction, the contact between the inner link 21 and the adjacent seat S can be suppressed.

Further, in the present embodiment, the inner link 21 and the outer link 22 are arranged at positions to sandwich the above foot link 10 in the width direction. In other words, the foot link 10 is placed between the inner link 21 and the outer link 22 in the width direction. Thereby, when the foot link 10 is pivoted to be folded at the time of stowing the seat S, the foot link 10 can be suppressed from being brought into contact with the inner link 21, the outer link 22, the third lock mechanism 21*c*, and the seatbelt anchor 21*d*.

In the present embodiment, as described above, the two foot links 10 are attached to the seat S having longer lateral width. As shown in FIG. 9, the foot link 10 on one side (on the outer side in the width direction) among the two foot links 10 is placed between the inner link 21 and the outer link 22. The foot link 10 on the other side (on the inner side in the width direction) is arranged between the inner link 21 provided in the seat S having shorter lateral width and the inner link 21 provided in the seat S having longer lateral width. In such a way, since the two foot links 10 are attached to the seat S having longer lateral width, a support state of the seat S can be more stabilized. Further, the foot link 10 placed between the inner links 21 of the separate seats S is arranged at a position where contact with the inner links 21 is suppressed. Thus, the foot links do not easily cause trouble when each of the seats S is individually stowed.

In the present embodiment, the guide link 23 is arranged at a position different from the inner link 21 and the outer link 22 in the front to back direction of the seat S. Specifically, the inner link 21 and the outer link 22 are arranged at the substantially same positions in the front to back direction. The guide link 23 is arranged on the slightly rear side of the above two pivot links 20 as shown in FIGS. 10 and 18. By the above arrangement of the guide link 23, the seat S can be more compactly stowed in the present embodiment. That is, in the present embodiment, by displacing the arrangement position of the guide link 23 from the arrangement positions of the inner link 21 and the outer link 22, a vehicle interior space is effectively utilized to arrange the pivot links 20. As a result, the seat S in a stowed state can be stowed more compactly.

The arrangement position of the guide link 23 is on the outer side in the width direction of the arrangement positions of the inner link 21 and the outer link 22, that is, the position close to the side wall of the vehicle in which the seat S is installed. With such a positional relationship, the arrangement position of the guide link 23 can be freely determined without restriction by the inner link 21 and the outer link 22. Further, in the configuration where the coupling portion (specifically, the short part 22*h* of the outer link 22) is provided between the inner link 21 and the outer link 22, the guide link 23 is arranged at the position away from a point between both the links 21, 22. Thus, contact between the guide link 23 and the coupling portion can be suppressed.

Further, in the present embodiment, the piston damper 24 described above is provided beside the guide link 23. More specifically, the piston damper 24 is placed on the front side of the guide link 23 in the front to back direction and arranged at the substantially same position as the guide link 23 in the width direction as shown in FIGS. 18 and 19. In other words, the piston damper 24 is provided at a position side by side with the guide link 23 in the front to back direction.

With the above positional relationship, at the time of stowing the seat S, the piston damper 24 is pivoted with respect to the vehicle body floor T together with the guide link 23 while biasing the seat cushion 1 toward the outer side in the extending direction thereof Thereby, the guide link 23 can smoothly move the seated portion Si including the seat cushion 1 to the stowed position while being assisted by the bias force of the piston damper 24.

Configuration of First Lock Mechanism of Foot Link

Next, a configuration of the first lock mechanism 11 provided in the lower end portion of the foot link 10 will be described based on FIGS. 24 to 28.

As shown in FIGS. 24 to 28, the first lock mechanism 11 is a device in which an engagement hook 12 is moved in the right and left direction and engaged with the striker T2.

The first lock mechanism 11 is coupled to the switching mechanism (not shown) via a cable member 17, and switchable by the switching mechanism between a lockable state where the engagement hook 12 is lockable onto the striker T2 and an unlockable state where the engagement hook is unlockable.

Figure 24:
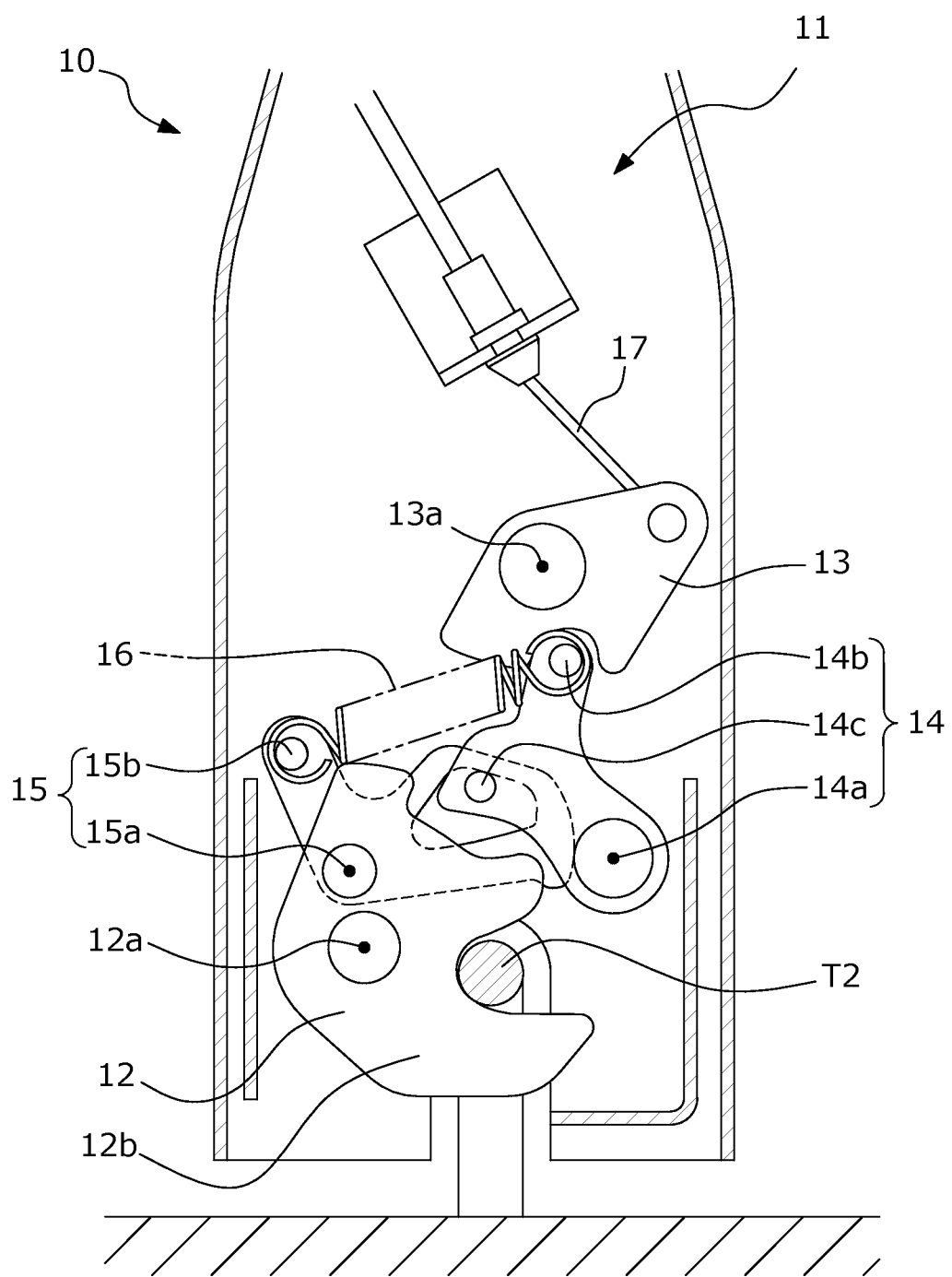
FIG. 24 is an illustrative side view showing a state where a first lock mechanism of a foot link is locked.

As shown in FIG. 24, the first lock mechanism 11 mainly includes the engagement hook 12, a first pivot plate 13, a second pivot plate 14, an actuation plate 15, and a bias spring 16 that biases the second pivot plate 14 to a position shown in FIG. 24.

The engagement hook 12 includes a hook pivot shaft 12a provided in a substantially center part in the up and down direction and axially supported on the foot link 10 in the front to back direction, and a projection portion 12b provided in a lower end portion to be retained onto the striker T2. Since the engagement hook 12 is rotated about the hook pivot shaft 12a, the projection portion 12b is moved in the right and left direction to be engaged with and disengaged from the striker T2.

The first pivot plate 13 includes a first pivot shaft 13a axially supported on the foot link 10 in the front to back direction, and is coupled to the cable member 17 to be described later.

The second pivot plate 14 includes a second pivot shaft 14a axially supported on the foot link 10 in the front to back direction, a retaining pin 14b extending in the front to back direction, the retaining pin onto which one end of the bias spring 16 is retained, and a coupling pin 14c coupled to the foot link 10. The coupling pin 14c passes through an insertion hole (not shown) formed in the actuation plate 15.

The actuation plate 15 includes an actuation pivot shaft 15a axially supported on the engagement hook 12 in the front to back direction, and a retaining pin 15b extending in the front to back direction, the retaining pin onto which the other end of the bias spring 16 is retained.

Figure 28:
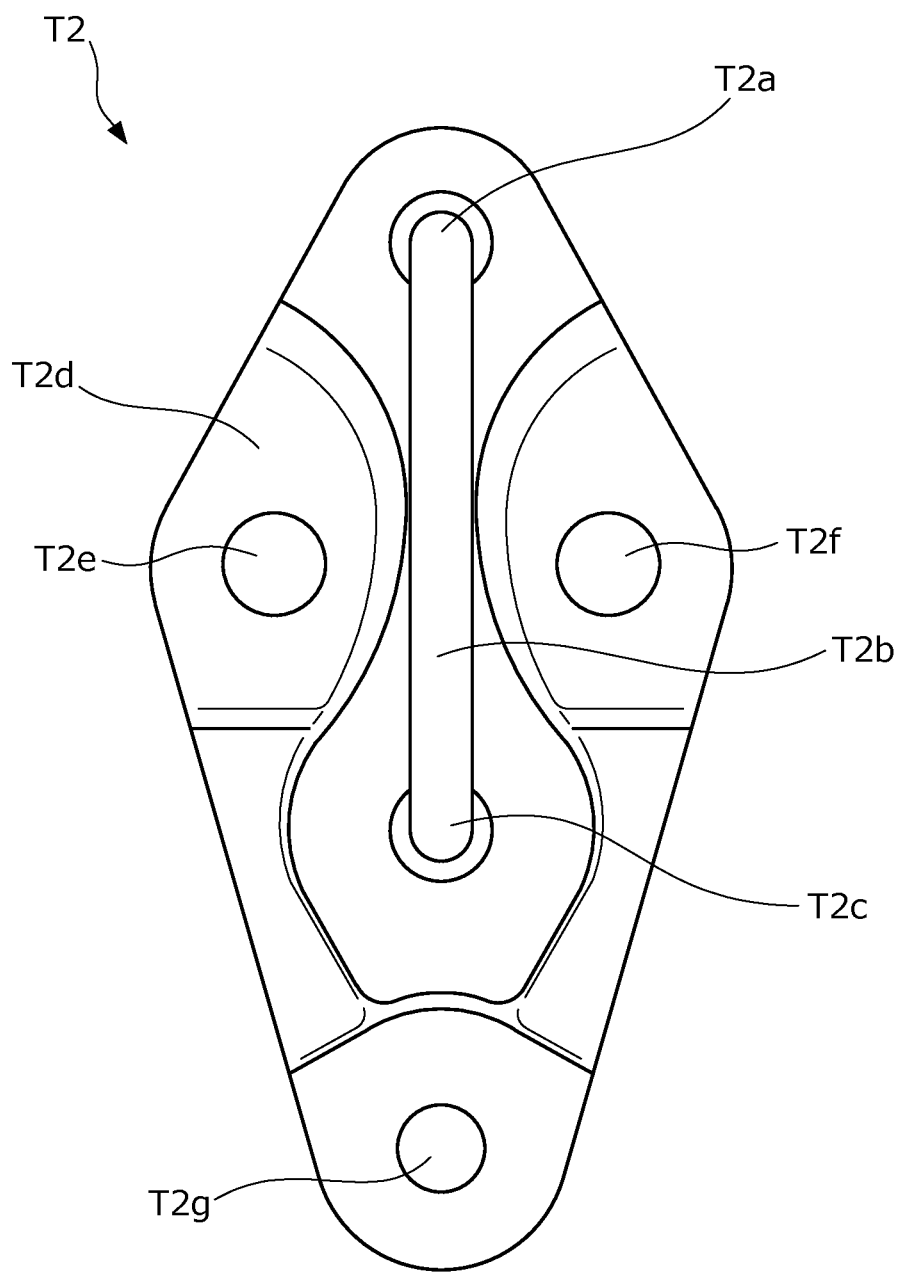
FIG. 28 is a schematic plan view of a striker.

As shown in FIG. 18 or 28, the striker T2 is made of a substantially U shaped pipe member extending in the front to back direction, the member fixed onto the vehicle body floor via a fixing member T2d to be engaged with the foot link 10.

The striker T2 stands up from an upper surface of the fixing member T2d, and includes a front leg portion T2a and a rear leg portion T2b arranged at positions different from each other in the front to back direction, and a leg coupling portion T2c engageable with the engagement hook 12, the leg coupling portion that couples upper ends of the front leg portion T2a and the rear leg portion T2b.

The leg coupling portion T2c is a part to be engaged with the engagement hook 12, extending substantially horizontally in the front to back direction.

The fixing member T2d is made of a substantially diamond shaped sheet metal member extending in the front to back direction, and includes a first fixing portion T2e, a second fixing portion T2f, and a third fixing portion T2g as parts that fasten fastening bolts (not shown) toward the vehicle body floor in the up and down direction.

The first fixing portion T2e and the second fixing portion T2f are arranged at facing positions in the front to back direction and separated in the right and left direction. The third fixing portion T2g is provided between the first fixing portion T2e and the second fixing portion T2f in the right and left direction.

The third fixing portion T2g is arranged on the rear side of the first fixing portion T2e and the second fixing portion T2f.

The striker T2 is provided between the first fixing portion T2e and the second fixing portion T2f in the right and left direction, and arranged on the front side of the third fixing portion T2g.

The rear leg portion T2b of the striker T2 is arranged in a region surrounded by the first fixing portion T2e, the second fixing portion T2f, and the third fixing portion T2g.

Parts of the fixing member T2d where the striker T2 is coupled are expanding parts expanding to the upper side of the first fixing portion T2e, the second fixing portion T2f, and the third fixing portion T2g, and enhance support rigidity of the striker T2.

The cable member 17 is made of a known cable member, and as shown in FIG. 24, couples the first lock mechanism 11 and the switching mechanism (not shown) to be towed by the switching mechanism to switch the first lock mechanism 11 from a lockable state to an unlockable state.

With the above configuration, at the position shown in FIG. 24, the first lock mechanism 11 is in a lock state where the engagement hook 12 is engaged with the striker T2.

Figure 25:
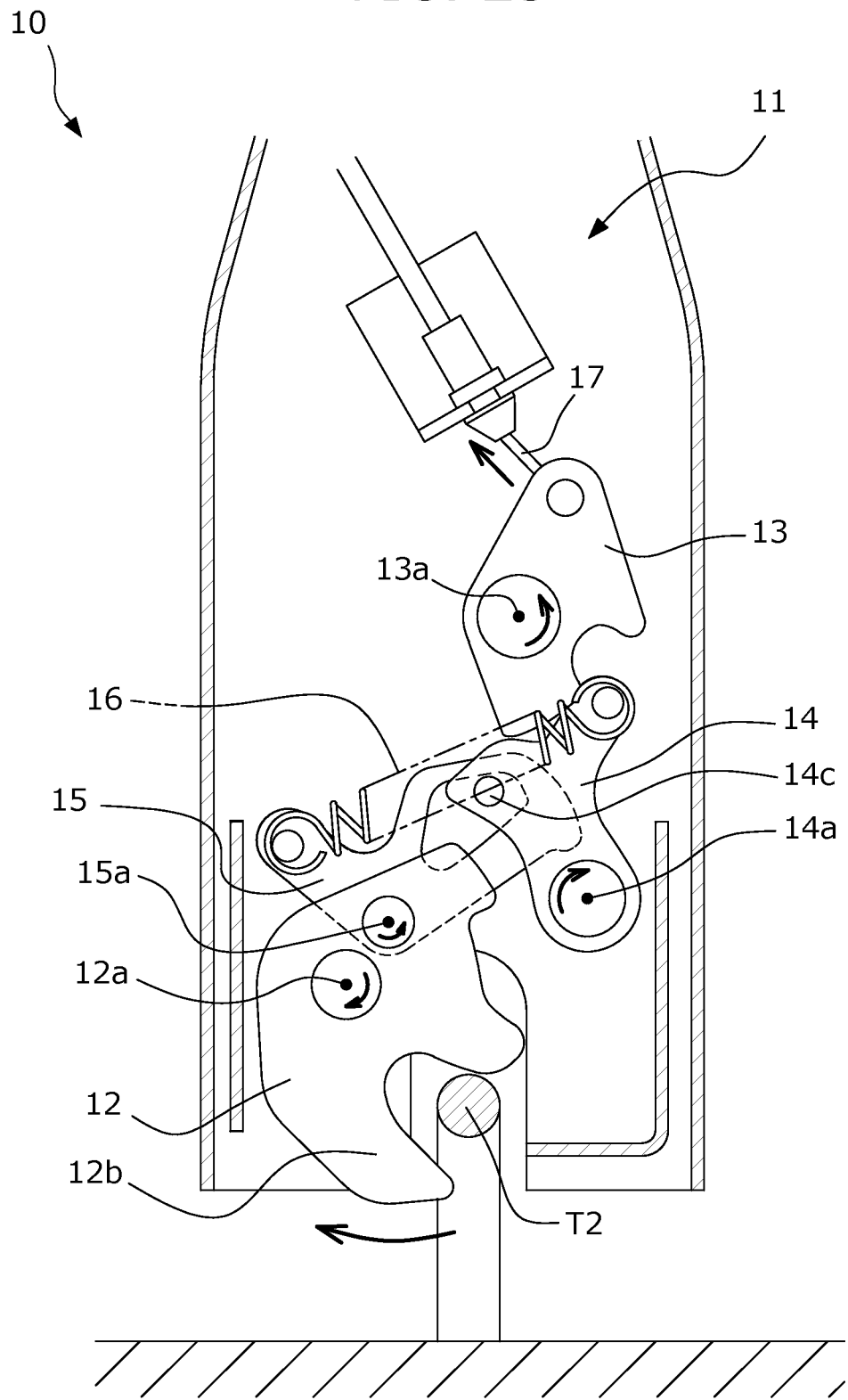
FIG. 25 is an illustrative side view showing a state where locking of the first lock mechanism is canceled and the first lock mechanism becomes unlockable.

When the cable member 17 is pulled in the direction of an arrow shown in FIG. 25 from the position shown in FIG. 24, locking of the engagement hook 12 onto the striker T2 is canceled. By always pulling the cable member 17 in the direction of the arrow shown in FIG. 25, the first lock mechanism 11 is maintained in an unlockable state.

Figure 26:
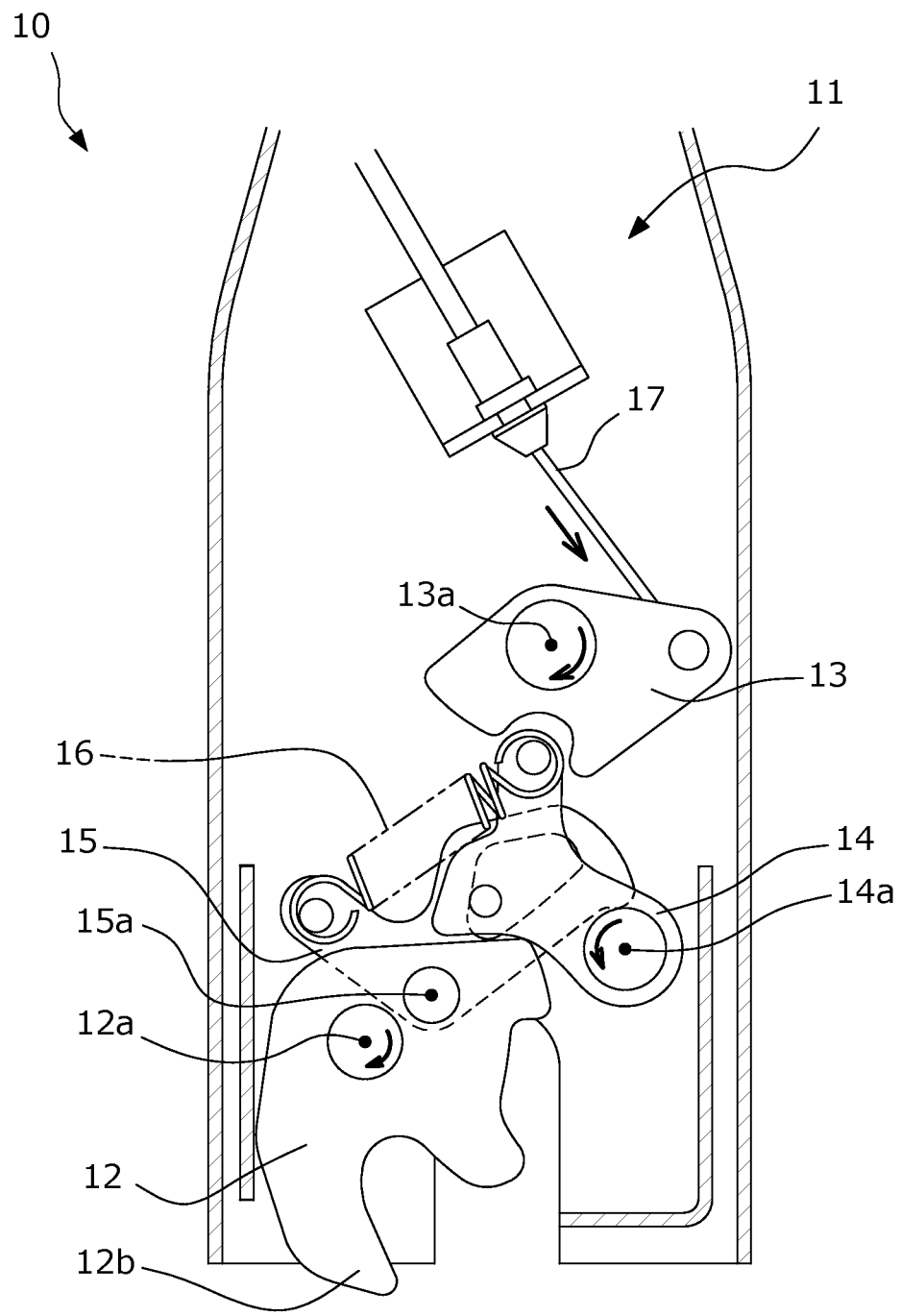
FIG. 26 is an illustrative side view showing a state where the first lock mechanism becomes lockable.

When the cable member 17 is released from the towed state as shown in FIG. 26 from the position shown in FIG. 25, the first lock mechanism 11 is switched to a lockable state.

Figure 27:
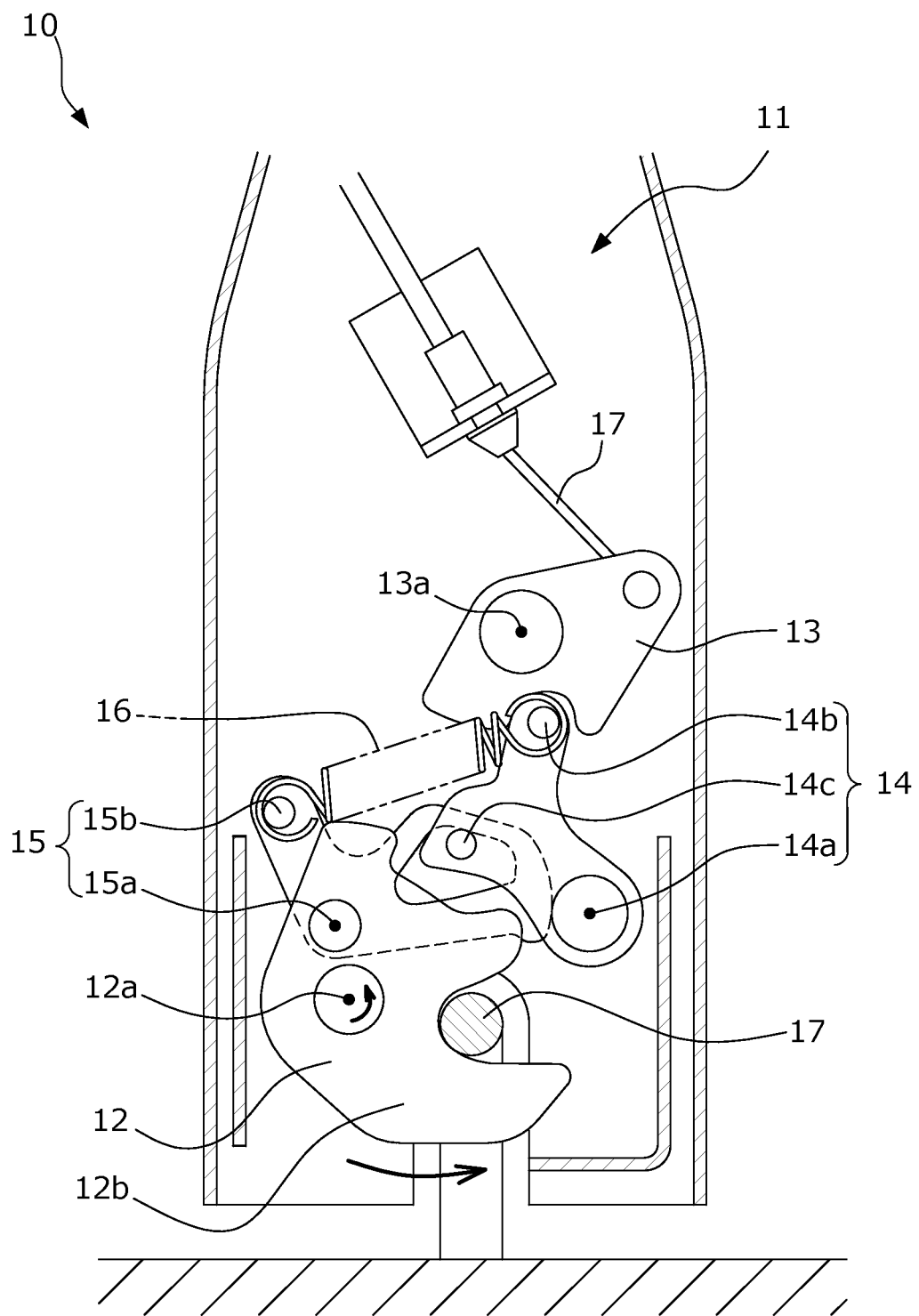
FIG. 27 is an illustrative side view showing a state where the first lock mechanism is locked again.

When the engagement hook 12 of the foot link 10 is pressed toward the striker T2 from the position shown in FIG. 26, the first lock mechanism is returned to a lock state where the engagement hook 12 is engaged with the striker T2 as shown in FIG. 27.

Configuration of Second Lock Mechanism of Seat Cushion

Next, a configuration of a second lock mechanism 80 provided in the rear end portion of the seat cushion 1 will be described based on FIGS. 18 to 19, 29.

As shown in FIGS. 18 to 19, 29, the second lock mechanism 80 is a device is a device in which an engagement hook 81 is moved in the right and left direction and engaged with a striker T4.

The second lock mechanism 80 is coupled to an operation lever (not shown) via a cable member 85. By pulling the operation lever, the engagement hook 81 can be disengaged from the striker T4. In detail, by pulling the operation lever, an engageable position where the engagement hook 81 is engageable with the striker T4 can be switched to a non-engageable position.

Figure 29A:
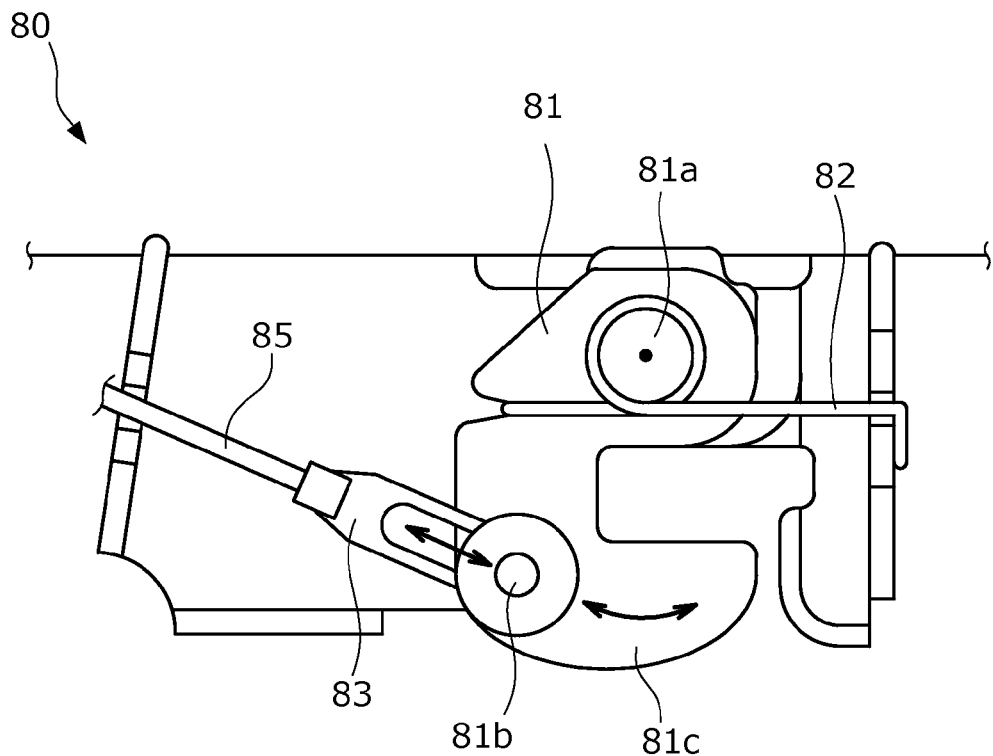
FIG. 29A is an illustrative side view showing an engageable position where a second lock mechanism of a seat cushion is lockable.

As shown in FIG. 29A, the second lock mechanism 80 mainly includes the engagement hook 81, a bias spring 82 that biases the engagement hook 81 to the engageable position, and an actuation plate 83.

The engagement hook 81 includes a hook pivot shaft 81a provided in an upper part and axially supported on the rear frame 34 of the seat cushion frame 1a via a coupling bracket (not shown) in the front to back direction, a coupling pin 81b provided in a lower part, the coupling pin extending in the front to back direction to be coupled to the actuation plate 83, and a projection portion 81c to be retained onto the striker T4.

Since the engagement hook 81 is rotated about the hook pivot shaft 81a, the projection portion 81c is moved in the right and left direction to be engaged with and disengaged from the striker T4. The coupling pin 81b passes through an insertion hole (not shown) formed in the actuation plate 83.

The bias spring 82 is wound around the hook pivot shaft 81a, and has one end serving as a free end retained onto the engagement hook 81, and the other end serving as a fixed end retained onto the side of the seat cushion frame 1a.

One end of the actuation plate 83 is coupled to the engagement hook 81 via the coupling pin 81b and the other end is coupled to the cable member 85.

In the second lock mechanism 80, at the position shown in FIG. 29A, the engagement hook 81 is arranged at the engageable position.

When the engagement hook 81 is pressed onto the striker T4 on the stowing floor from the upper side, the engagement hook 81 is rotated about the hook pivot shaft 81a clockwise when seen from the seat back surface side, and returned again to the engageable position by bias force of the bias spring 82 while the projection portion 81c tucking the striker T4.

In detail, since the coupling pin 81b of the engagement hook 81 is freely movable in the right and left direction in the insertion hole of the actuation plate 83, the projection portion 81c is abutted with the striker T4, and movable in the right and left direction by being pressed and moved by the striker T4.

As a result of the above description, the engagement hook 81 is engaged with and locked onto the striker T4.

Figure 29B:
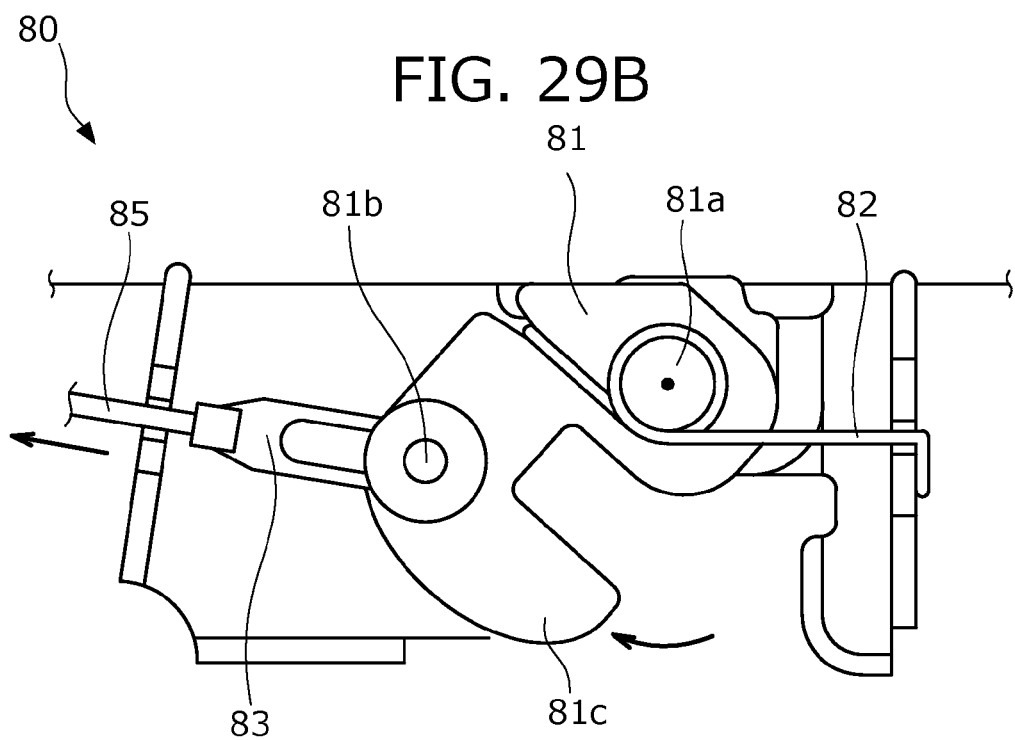
FIG. 29B is an illustrative side view showing a non-engageable position where the second lock mechanism is unlockable.
Figure 30:
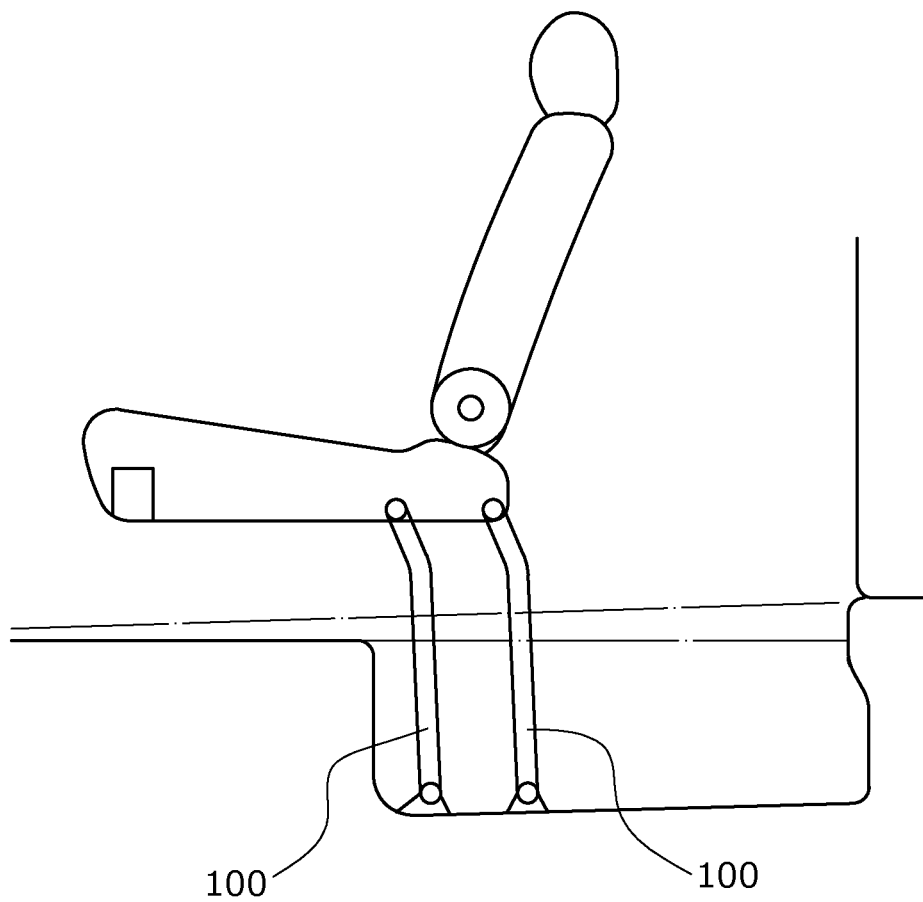
FIG. 30 is a side view showing a configuration of a conventional vehicle seat.

When the cable member 85 is pulled in the direction of an arrow shown in FIG. 29B from the position shown in FIG. 29A, the actuation plate 83 clockwise pushes and rotates the engagement hook 81 about the hook pivot shaft 81a via the coupling pin 81b. As a result, the engagement hook 81 is moved to the non-engageable position and the striker T4 is disengaged so that the locking is canceled.

As long as the cable member 85 is pulled, the engagement hook 81 is always biased to the non-engageable position. When the pulling of the cable member 85 is canceled, the engagement hook 81 is returned to the engageable position.
Other Embodiments Various embodiments of the vehicle seat of the present invention are mainly described above. However, the above embodiments are not to limit the present invention but to facilitate understanding of the present invention. The present invention can be modified and improved without departing from the gist thereof, and the present invention includes equivalent items thereof as a matter of course.

In the above embodiments, the guide link 23 is arranged on the rear side of the inner link 21 and the outer link 22 in the front to back direction of the seat S. However, the arrangement position of the guide link 23 is not limited to the position on the rear side of the inner link 21 and the outer link 22. That is, the arrangement position of the guide link 23 may be a position where the seat S can be more compactly stowed while suppressing the contact between the pivot links 20 and not particularly limited as long as the arrangement position is a position different from those of the inner link 21 and the outer link 22 in the front to back direction.

In the above embodiments, the length in the front to back direction, the length in the width direction, and the second moment of area of the inner link 21 are all greater than those of the outer link 22. However, the present invention is not limited to this. That is, at least one or more of the length in the front to back direction, the length in the width direction, and the second moment of area of the inner link 21 are required to be greater than those of the outer link 22.

In the above embodiments, the coupling portion that couples both the links 21, 22 is provided between the inner link 21 and the outer link 22. Further, in the present embodiment, the coupling portion is one part of the outer link 22, more specifically, the short part 22h of the outer link 22. Thereby, without increasing the number of parts, the inner link 21 and the outer link 22 are coupled to each other, so that rigidity of the outer link 22 can be ensured.

Figure 23:
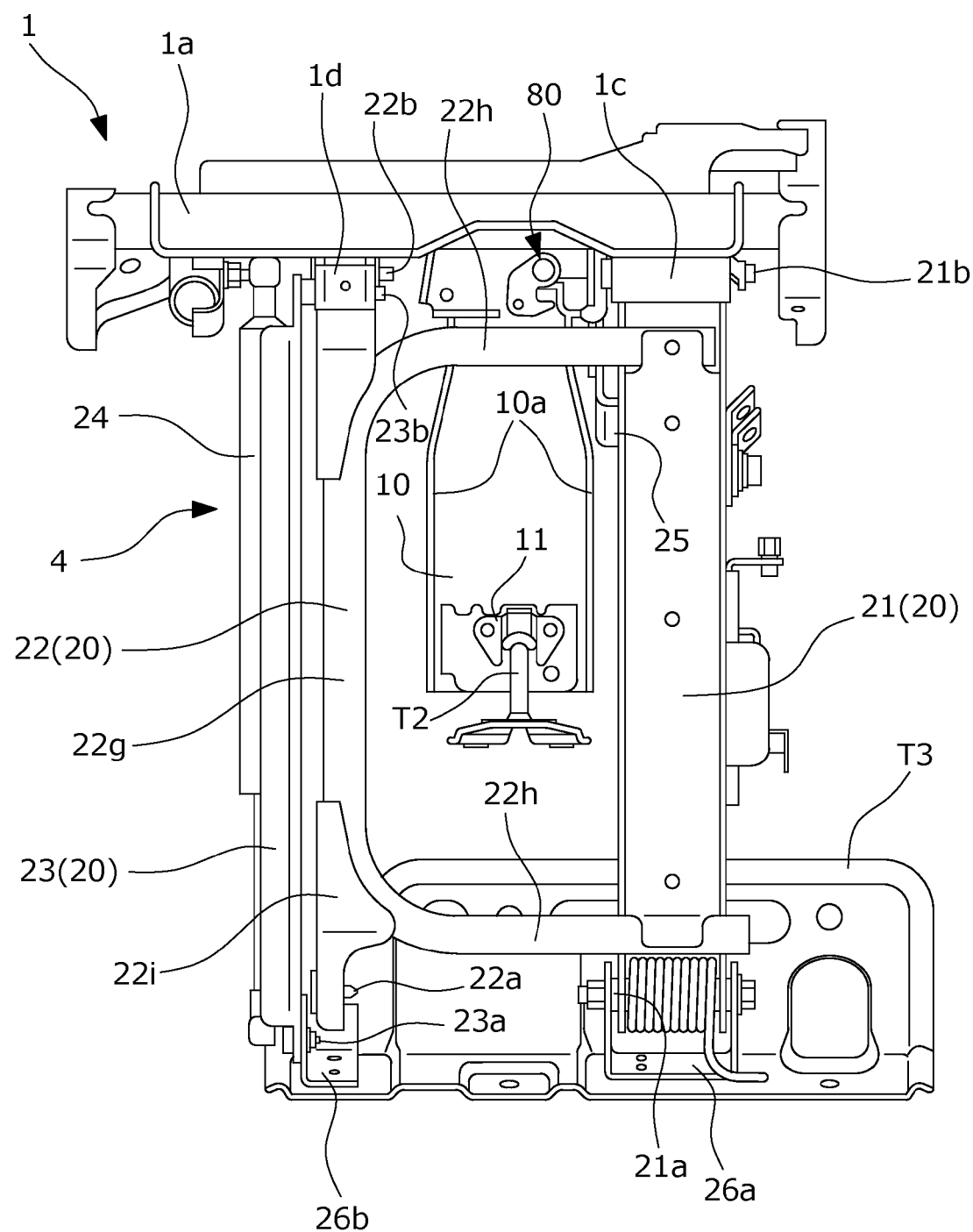
FIG. 23 is a rear view showing a modified example of the seat stowing mechanism, the view corresponding to FIG. 19.

In order to more effectively exhibit such an effect, as shown in FIG. 23, the outer link 22 may be bent into a 90-degree-rotated U shape and short parts 22h formed on the upper side and on the lower side may be respectively used as coupling portions.

That is, a first coupling portion that couples parts of the inner link 21 and the outer link 22 on the one end side in the extending direction, and a second coupling portion that couples parts of the inner link 21 and the outer link 22 on the other end side in the extending direction may be provided. With such a configuration, the rigidity of the outer link 22 can be further improved.

The first coupling portion and the second coupling portion may be formed by the short part 22h on the upper side and the short part 22h on the lower side formed in the outer link 22. When a housing portion that houses the inner link 21 is formed and the short part 22h on the upper side is welded to the inner link 21 as well as the short part 22h on the lower side, compactability can be achieved and the rigidity can be improved.

In the above embodiment, the number of the pivot links 20 is three. However, the number of the pivot links 20 is only required to be at least three or more, and the present invention can also be applied to a vehicle seat having four or more pivot links 20.

In the above embodiment, the vehicle seat S is formed in such a manner that the seat cushion 1 is stowable at the stowed position formed on the seat rear side. However, the present invention is not limited to this. For example, the seat cushion 1 may be stowable at a stowed position formed on the seat front side.

In the above embodiment, the piston damper 24 is attached at the position to bias the seat cushion 1 downward at the stowed position. However, the piston damper may be attached at a position to bias the seat cushion 1 in the horizontal direction.

With such a configuration, the piston damper 24 does not bias the seat cushion 1 upward at the stowed position at any rate. Thus, for example, sudden spring of the seat S and collision with the operator (passenger) can be suppressed.

In the above embodiment, the stowable vehicle seat to be used in an automobile is described as a specific example. However, the present invention is limited to this. The vehicle seat can also be utilized as a seat for a means of transportation such as an airplane and a vessel in addition to the vehicle seat for a train, a bus, and the like.

| TABLE OF REFERENCE NUMERALS | |
|---|---|
| Cb: | Cable |
| L: | Reclining unit |
| S: | Seat (vehicle seat) |
| Sl: | Seated portion |

TABLE OF REFERENCE NUMERALS

| | | |
|---|---|---|
| St: | Operation strap | |
| T: | Vehicle body floor | |
| | T1: | Stowing space |
| | T2: | Striker |
| | | T2a: Front leg portion |
| | | T2b: Rear leg portion |
| | | T2c: Leg coupling portion |
| | | T2d: Fixing member |
| | | T2e: First fixing portion |
| | | T2f: Second fixing portion |
| | | T2g: Third fixing portion |
| | T3: | Attachment bracket |
| | T4: | Striker |
| 1: | Seat cushion | |
| | 1a: | Seat cushion frame |
| | 1c, | Fixing bracket |
| | 1d: | |
| 2: | Seat back | |
| | 2a: | Seat back frame |
| 3: | Headrest | |
| | 3a: | Headrest pillar |
| 4: | Seat stowing mechanism | |
| 10: | Foot link | |
| | 10a: | Flange portion |
| | 10c: | Foot link pivot shaft |
| 11: | First lock mechanism | |
| 12: | Engagement hook | |
| | 12a: | Foot pivot shaft |
| | 12b: | Projection portion |
| 13: | First pivot plate | |
| | 13a: | First pivot shaft |
| 14: | Second pivot plate | |
| | 14a: | Second pivot shaft |
| | 14b: | Retaining pin |
| | 14c: | Coupling pin |
| 15: | Actuation plate | |
| | 15a: | Actuation pivot shaft |
| | 15b: | Retaining pin |
| 16: | Bias spring | |
| 17: | Cable member | |
| 20: | Pivot link | |
| 21: | Inner link | |
| | 21a: | Inner link pivot shaft |
| | 21b: | Coupling shaft |
| | 21c: | Third lock mechanism |
| | | 21ca: Engagement hook |
| | 21d: | Seatbelt anchor |
| | 21e: | Housing portion |
| | | 21ea: Tongue shaped projection |
| | | 21eb: Lower end portion |
| | | 21ec: Cut-away portion |
| | 21f, | Welding portion |
| | 21g: | |
| | 21x, | Steel plate |
| | 21y: | |
| 22: | Outer link | |
| | 22a: | Outer link pivot shaft |
| | 22b: | Coupling shaft |
| | 22g: | Long part |
| | 22h: | Short part |
| | 22i: | Extending bracket |
| 23: | Guide link | |
| | 23a: | Guide link pivot shaft |
| | 23b: | Coupling shaft |
| 24: | Piston damper | |
| 25: | Intermediary member | |
| | 26a, | Shaft fixing tool |
| | 26b: | |
| 31: | Inner-side side frame | |
| 32: | Door-side side frame | |
| 33: | Front frame | |
| | 33a: | Front portion |
| | 33b: | Inclined portion |
| | 33c: | Side portion |
| 34: | Rear frame | |
| 35: | Fixing bracket | |
| | 35a: | Main body portion |
| | 35b, | Lateral plate |
| | 35c: | |
| | 35d: | Front plate |
| | 35e, | Flange portion |
| | 35f: | |
| | 35g: | Pivot shaft |
| 36: | S spring | |
| 37: | First wire member | |
| | 37a: | Front portion fixing portion |
| | 37b: | Front portion |
| | 37c: | Inclined portion fixing portion |
| | 37d: | Side portion |
| | 37e: | Frame fixing portion |
| 38: | Second wire member | |
| 39: | Auxiliary frame | |
| 40: | Pan frame | |
| 41: | Right-left extending portion | |
| | 41a, | End portion |
| | 42a, | |
| | 42b: | |
| 42: | Front-back extending portion | |
| 43: | Locking hole | |
| 44: | Cut-away portion | |
| 45, | | |
| 46: | | |
| 47: | Oblique side | |
| 51: | Frame member | |
| | 51a: | Upper frame portion |
| | 51b: | Lower frame portion |
| | 51c: | Upper outer side inclined portion |
| | 51d: | Upper inner side inclined portion |
| | 51e: | Lower inner side inclined portion |
| | 51f: | Flat surface portion |
| | 51i: | Inner frame portion |
| | 51o: | Outer frame portion |
| | 51s: | Auxiliary frame member |
| 52: | Bracket | |
| 53: | Oval annular body | |
| 54, | Side frame | |
| 55: | | |
| | 54a, | Side portion |
| | 55a: | |
| | 54b, | Front edge portion |
| | 55b: | |
| | 54c, | Rear edge portion |
| | 55c: | |
| | 54cu, | Expanding portion |
| | 54cl, | |
| | 55cu, | |
| | 55cl: | |
| | 54d, | Shaft hole |
| | 55d: | |
| 56, | Pivot shaft | |
| 65: | | |
| 57: | Rigidity improvement member | |
| | 57a: | Projection portion |
| | 57l: | Lower end |
| | 57u: | Upper end |
| 60: | Pan frame | |
| | 60b: | Bead |
| 61: | Upper linear member | |
| 62: | Lower linear member | |
| | 61e, | End portion |
| | 62e, | |
| | 70e: | |
| 63: | Movable unit | |
| 64: | Reinforcing plate | |
| | 64l: | Lower side |
| | 64u: | Upper side |
| 66: | First arm | |
| 67: | Second arm | |
| 68: | Flat surface portion | |
| 69: | Bead | |
| 70: | Guide linear member | |
| | 70s: | Straight portion |

-continued

TABLE OF REFERENCE NUMERALS

| 80: | Second lock mechanism | |
|---|---|---|
| 81: | Engagement hook | |
| | 81a: | Hook pivot shaft |
| | 81b: | Coupling pin |
| | 81c: | Projection portion |
| 82: | Bias spring | |
| 83: | Actuation plate | |
| 84: | Striker | |
| 85: | Cable member | |
| 100: | Pivot link | |

The invention claimed is:

1. A vehicle seat stowable at a stowed position formed on a vehicle body floor, comprising:
   first, second, and third links coupled to a seat cushion provided in the vehicle seat, the first, second, and third links being pivotable with respect to the vehicle body floor in order to move the seat cushion to the stowed position,
   wherein:
   the first, second, and third links are arranged at positions different from each other in a width direction of the vehicle seat; and
   the third link is arranged at a position different from the first and second links in a front to back direction of the vehicle seat.

2. The vehicle seat according to claim 1, wherein:
   the third link is arranged at a position closer to the second link among the first and second links in the width direction; and
   at least one or more of length in the front to back direction, length in the width direction, and second moment of area of the first link are greater than those of the second link.

3. The vehicle seat according to claim 1, wherein the arrangement position of the first link is a position closer to center of the vehicle seat than the arrangement position of the second link in the width direction.

4. The vehicle seat according to claim 1, comprising:
   a coupling portion that couples the first link and the second link.

5. The vehicle seat according to claim 4, wherein the coupling portion is one part of the second link.

6. The vehicle seat according to claim 1, wherein:
   the first link is arranged on one end side of the seat cushion in the width direction;
   the second link is arranged on an other end side of the seat cushion in the width direction; and
   the arrangement position of the third link is a position closer to a side wall of a vehicle in which the vehicle seat is installed than the arrangement positions of the first and second links in the width direction.

7. The vehicle seat according to claim 1, wherein:
   the third link is a guide link that guides the seat cushion in such a manner that the seat cushion is moved to the stowed position along a predetermined trajectory; and
   a bias member that is pivotable with respect to the vehicle body floor together with the guide link while biasing the seat cushion is provided at a position side by side with the guide link in the front to back direction.

8. The vehicle seat according to claim 1, comprising:
   a support member arranged between the vehicle body floor and the seat cushion, the support member supporting the seat cushion,
   wherein:
   in a case where two vehicle seats are provided side by side along the width direction, the first, second, and third links and the support member are provided for each of the vehicle seats; and
   at least one of the two vehicle seats includes the support member placed between the first link and the second link in the width direction, and the support member placed between the first links of the separate vehicle seats.

9. The vehicle seat according to claim 2, wherein the first link has a closed section structure.

10. The vehicle seat according to claim 2, wherein a seatbelt anchor is fixed to the first link.

11. The vehicle seat according to claim 2, comprising:
    a coupling portion that couples parts of the first link and the second link on a one end side in an extending direction, wherein at least a part of the coupling portion is fixed in a state where the part is housed in an end portion of the first link on the vehicle body floor side.

12. The vehicle seat according to claim 2, wherein:
    the seat cushion includes a framework shaped seat cushion frame, and a pan frame provided in a front portion of a region partitioned by the seat cushion frame;
    a support leg whose one end side is fixed to the seat cushion, the support leg supporting the seat cushion at a use position and being brought into a state where the seat cushion is not supportable at the stowed position is provided; and
    the pan frame is arranged to avoid a support leg attachment portion that couples the support leg to the seat cushion frame.

13. The vehicle seat according to claim 2, comprising:
    a bias member whose one end side is attached to the seat cushion and an other end side is coupled to the vehicle body floor, the bias member biasing the seat cushion downward or in a horizontal direction at the stowed position.

14. The vehicle seat according to claim 2, comprising:
    a seat back frame including a pair of vertical frame portions that extend along an up and down direction in a side portion of the vehicle seat, and a pair of horizontal frame portions that respectively couple upper end sides and lower end sides of the pair of vertical frame portions;
    a pan frame fixed to the seat back frame, the pan frame extending in a region partitioned by the seat back frame;
    a linear member fixed to one surface of the pan frame and bridged to couple the pair of vertical frame portions;
    an input portion to which an operation move of an operator for moving the vehicle seat between the use position and the stowed position of the vehicle seat is transmitted; and
    a transmission device that transmits the move transmitted to the input portion to a movement device that moves the vehicle seat between the use position and the stowed position, wherein the transmission device is abutted with the linear member.

* * * * *